United States Patent
Andersen et al.

(10) Patent No.: US 6,638,401 B1
(45) Date of Patent: Oct. 28, 2003

(54) HIGH DISCHARGE CAPACITY ELECTROLYTIC MANGANESE DIOXIDE AND METHODS OF PRODUCING THE SAME

(75) Inventors: Terrell Neils Andersen, Edmond, OK (US); Samuel Faust Burkhardt, Edmond, OK (US); Wilmont Frederick Howard, Jr., Edmond, OK (US); Richard F. Wohletz, Las Vegas, NV (US); Vahid Kazerooni, Yukon, OK (US); Mohammad Reza Moumenzadeh, Oklahoma City, OK (US); Amy Wren Unsell, Choctaw, OK (US)

(73) Assignee: Kerr-McGee Chemical LLC, Oklahoma City, OK (US)

( * ) Notice: Subject to any disclaimer, the term of this patent is extended or adjusted under 35 U.S.C. 154(b) by 0 days.

(21) Appl. No.: 09/610,821

(22) Filed: Jul. 6, 2000

Related U.S. Application Data

(62) Division of application No. 09/217,168, filed on Dec. 21, 1998, now Pat. No. 6,214,198.

(51) Int. Cl.[7] .................................................. H01M 4/50
(52) U.S. Cl. ....................... 204/293; 205/533; 429/224; 423/605
(58) Field of Search .......................... 429/224; 204/293; 423/605; 205/533

(56) References Cited

U.S. PATENT DOCUMENTS

| | | | | |
|---|---|---|---|---|
| 5,516,604 A | * | 5/1996 | Mieczkowska et al. | 429/224 |
| 5,580,681 A | * | 12/1996 | Fleischer | 429/192 |
| 5,607,796 A | * | 3/1997 | Jacus et al. | 429/165 |
| 5,731,105 A | * | 3/1998 | Fleischer et al. | 429/192 |
| 5,866,278 A | * | 2/1999 | Sumida et al. | 429/224 |
| 6,143,446 A | * | 11/2000 | Davis et al. | 429/229 |
| 6,225,009 B1 | * | 5/2001 | Fleischer et al. | 429/306 |
| 6,527,941 B2 | * | 3/2003 | Andersen et al. | 205/533 |

* cited by examiner

Primary Examiner—Arun S. Phasge
(74) Attorney, Agent, or Firm—McAfee & Taft

(57) ABSTRACT

The present invention provides improved cathode material comprised of electrolytic manganese dioxide having high discharge capacity at high discharge rates and methods of producing such electrolytic manganese dioxide by electrolysis in an electrolytic cell. The methods are basically comprised of maintaining a heated high purity aqueous electrolyte solution comprising sulfuric acid and manganese sulfate in the electrolytic cell, the manganese sulfate being present in the solution whereby it contains in the range of from about 5 to about 50 grams of manganese per liter of solution. An electric current is applied to the electrodes of the electrolytic cell whereby the anodic electrode current density is in the range of from about 2.5 to about 6 amperes per square foot.

3 Claims, 11 Drawing Sheets

HIGH DISCHARGE CAPACITY ELECTROLYTIC MANGANESE DIOXIDE AND METHODS OF PRODUCING THE SAME

This application is a divisional of application Ser. No. 09/217,168 filed on Dec. 21, 1998 now U.S. Pat. No. 6,214,198.

BACKGROUND OF THE INVENTION

1. Field of the Invention

The present invention relates to electrolytic manganese dioxide for use as the cathode in batteries and methods of producing the electrolytic manganese dioxide. More particularly, the present invention provides electrolytic manganese dioxide which when utilized in batteries imparts higher discharge capacity at high discharge rates thereto.

2. Description of the Prior Art

Electrolytic manganese dioxide, referred to in the industry as EMD, is widely used as the cathode material in batteries. EMD was first utilized in zinc-carbon cells (Leclanche cells), and later in alkaline cells.

EMD is used in alkaline batteries to achieve high voltages, low polarization and high discharge capacities. The discharge capacity of alkaline batteries is dependent upon the quality of the EMD utilized. The mixture forming the cathode in alkaline batteries is about 82% EMD and is generally formed into an annular cathode by impact extrusion in the container or by the compression molding of pellets which are recompacted against the container. In both of these processes, the properties of the EMD must be very consistent to allow the battery manufacturer to consistently produce high quality batteries. Alkaline batteries have a higher capacity per unit volume than other zinc-manganese dioxide batteries, and are particularly capable of high discharge capacity, i.e., long life, at high discharge rates.

To achieve the EMD purity required in its production utilizing the well known electrolysis method, a highly purified manganese sulfate solution must be provided to the electrolytic cell. In addition, the electrolytic cell must be operated within a narrow range of process conditions.

By the end of the 1980's, EMD was developed having what was thought to be a satisfactory discharge capacity at the then maximum discharge rates demanded by portable devices, i.e., about 0.5 watt. However, during the past several years, the development of lap-top computers, video cameras, cellular phones and the like have brought about a demand for high discharge capacity at higher discharge rates, i.e., from 1 to 2 watts. While some improvements in battery performance at high discharge rates have been made, EMD has not changed significantly in discharge capacity or in the process conditions utilized in its production for many years. Thus, there is a continuing need for better, higher quality EMD whereby alkaline and other batteries utilizing the EMD have higher discharge capacities at the higher discharge rates presently required.

SUMMARY OF THE INVENTION

The present invention provides improved high quality EMD for use as cathode material in batteries of high discharge capacity at high discharge rates and methods of producing such EMD by electro-deposition in an electrolytic cell. The electrolytic cell includes cathodic and anodic electrodes disposed therein through which an electric current is passed. In accordance with the methods of the present invention, a heated aqueous electrolyte solution comprising sulfuric acid and manganese sulfate is maintained in the electrolytic cell. The solution is of high purity and includes manganese sulfate therein in an amount whereby manganese is present in the range of from about 5 to about 50 grams of manganese per liter of solution. An electric current is applied to the cathodic and anodic electrodes and the electrolyte solution whereby the anodic electrode current density is in the range of from about 2.5 to about 6 amperes per square foot, and the high discharge capacity EMD produced is deposited on the anode.

The temperature of the electrolyte solution in the electrolytic cell is carefully maintained in the range of from about 95° C. to about 98° C. Also, the sulfuric acid concentration in the electrolyte solution is maintained in an amount in the range of from about 20 to about 50 grams of sulfuric acid per liter of solution.

The cathode utilized in the electrolytic cell is preferably comprised of copper, graphite or steel, as determined by cost. The anode is preferably comprised of titanium to provide minimum weight and volume, maximum strength, minimum weight loss, and adequate corrosion resistance.

It is, therefore, a general object of the present invention to provide improved electrolytic manganese dioxide having higher discharge capacity at high discharge rates and methods of producing the same.

Other and further objects, features and advantages of the present invention will be readily apparent to those skilled in the art upon a reading of the description of preferred embodiments which follows.

DESCRIPTION OF PREFERRED EMBODIMENTS

Figure 1:
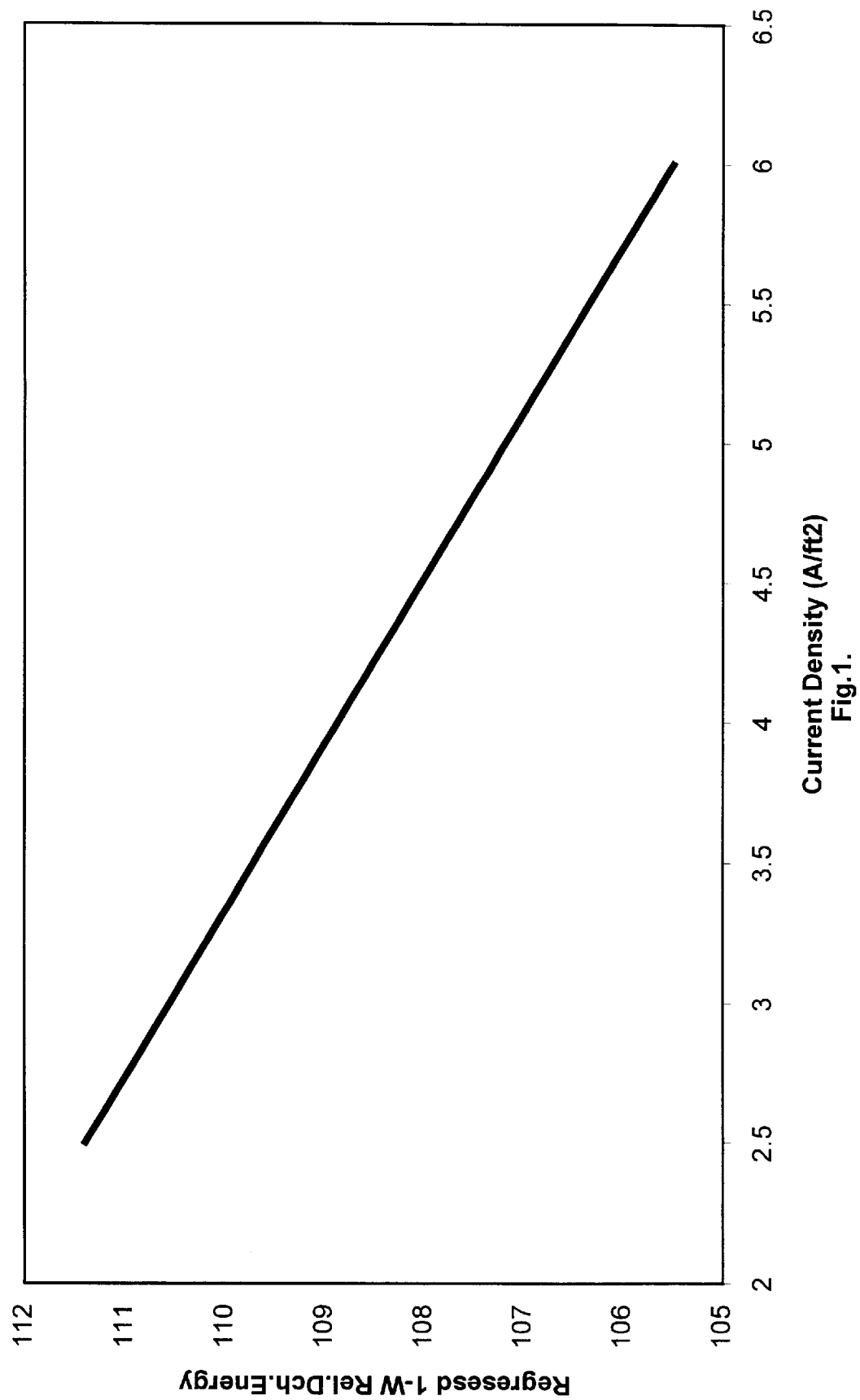
FIG. 1 is a plot of relative discharge energy in AA cells vs. the EMD deposition current density at 95° C., 30 g/l $H_2SO_4$ and 30 g/l $Mn^{2+}$ as obtained from multiple regression of the experimental results (Table II) in the current density range of 2.5–6.0 $A/ft^2$.

Electrolytic manganese dioxide (EMD) is produced by subjecting an aqueous electrolyte solution comprised of sulfuric acid and manganese sulfate to electrolysis in an electrolytic cell having cathodic and anodic electrodes disposed therein. The electrolysis process causes oxidation of the manganese sulfate at the anodic electrode and the deposition of a coating of the desired manganese dioxide product on the anode. When the coating has built up to a desired thickness, the anode is removed from the electrolytic cell and the coating is removed therefrom.

As mentioned above, it is imperative that the manganese sulfate supplied to the electrolytic cell is of high purity. Further, it is imperative that the cathode and anode in the electrolytic cell resist corrosion. As a result, various methods of producing manganese sulfate solutions of improved purity have heretofore been developed. For example, U.S. Pat. No. 4,483,828 issued on Nov. 20, 1984 to Laughlin et al., U.S. Pat. No. 4,485,073 issued on Nov. 27, 1984 to Robertson et al. and U.S. Pat. No. 4,489,043 issued on Dec. 18, 1984 to Bowerman et al. are all directed to methods of producing high purity manganese sulfate solutions and are all assigned to Kerr-McGee Chemical Corporation. U.S. Pat. No. 4,606,804 issued Dec. 18, 1984 to Schulke and Spore, and U.S. Pat. No. 4,477,320 issued Oct. 16, 1984 to Riggs, Jr. and assigned to Kerr-McGee Chemical Corporation disclose an improved anode formed of titanium and an improved cathode formed of copper, respectively. All of the above mentioned patents are incorporated herein by reference and are to be taken and considered as a part hereof as if they were fully set out herein.

To produce high purity EMD having high discharge capacity suitable for use in alkaline batteries, the electrolytic cell must be operated within a rather narrow range of conditions. Typical electrolytic cell conditions used in the industry for producing alkaline-battery grade EMD are given by E. Preisler in *J. Applied Electrochemistry*, Vol. 19 (1989) pp. 559–565. These conditions are a temperature of 90–95° C., a current density of 6.5–9.3 A/ft$^2$, a sulfuric acid concentration of 9.8–39 g/l and a manganese ion concentration of 27–55 g/l. Titanium anodes were used. Other publications present conditions that are equivalent or nearly equivalent to these.

Very recently Takehara et al. (U.S. Pat. No. 5,746,902 issued on May 5, 1998 and assigned to Japan Metals and Chemicals Company Ltd.) set forth conditions for manufacturing EMD for alkaline manganese batteries to make them excellent in both initial performance and storability. These conditions consist of a current density of 0.4 to 0.9 A/dm$^2$ (3.7 to 8.4 A/ft$^2$), an electrolyte solution temperature of from 94° C. to 103° C., an electrolyte solution sulfuric acid concentration of 0.30 to 0.45 mol/liter (29.4 to 44.1 g/l) and a manganese sulfate concentration of 0.5 to 1.0 mol/liter (27.5 to 55 g/l of manganese ions). Their temperatures and current densities were correlated inversely; i.e., they taught the use of the higher temperature with the lower current density and vice versa. These sulfuric acid and manganese ion concentrations are typical of prior art, but the lower end of the current density range is decreased somewhat and the upper temperature is increased somewhat.

These investigators also gave a set of conditions for manufacturing EMD in a so-called suspension or slurry cell, in which tiny particulates of manganese oxide are suspended in the electrolyte solution. However, this latter modification of EMD deposition does not pertain to the present invention.

The present invention is based on the discovery that improved EMD for use as cathode material in batteries having an unexpected high capacity at high discharge rates, i.e., rates of from 1 to 3 watts in AA-cells, can be produced when a low anodic current density is utilized in combination with a low concentration of manganese sulfate in the electrolyte solution.

More specifically, the methods of the present invention for producing very high discharge capacity EMD by electrolysis in an electrolytic cell are basically comprised of the steps of maintaining a heated aqueous electrolyte solution comprising sulfuric acid and manganese sulfate in the electrolytic cell, the solution having manganese sulfate therein in an amount whereby manganese is present in the range of from about 5 to about 50 grams of manganese per liter of solution, and applying electric current to the electrodes whereby the anodic electrode current density is in the range of from about 2.5 to about 6 amperes per square foot and the high discharge capacity EMD produced is deposited on the anodic electrode.

The aqueous electrolyte solution is maintained in the electrolytic cell at a temperature in the range of from about 95° C. to about 98° C. Also, the concentration of sulfuric acid in the aqueous electrolyte solution is maintained in the range of from about 20 to about 60 grams of sulfuric acid per liter of solution.

In order to insure that the above described conditions are consistently maintained, the anodic electrode utilized in the electrolysis process is preferably comprised of titanium as described in the above mentioned U.S. Pat. No. 4,606,804, and the cathodic electrode is preferably comprised of copper as described in the above mentioned U.S. Pat. No. 4,477, 320.

More preferred electrolysis conditions for carrying out the methods of this invention include maintaining the manganese sulfate in the aqueous electrolyte solution in an amount whereby manganese is present in the range of from about 5 to about 20 grams of manganese per liter of solution, applying electric current to the electrodes whereby the anodic electrode current density is in the range of from about 2.5 to about 3.5 amperes per square foot, maintaining the electrolytic solution at a temperature in the range of from about 95° C. to about 98° C. and maintaining the sulfuric acid concentration in the electrolyte solution in an amount in the range of from about 25 to about 40 grams of sulfuric acid per liter of solution. In addition, the concentration of the sulfuric acid in the electrolytic.solution is maintained at a level greater than or equal to two times the concentration of manganese therein.

Some of the unexpected average properties of the improved EMD of this invention having high discharge capacity at high discharge rates produced by the methods of this invention are set forth in Table I below. For comparison purposes, the same properties of the best high discharge capacity EMD produced using prior art electrolysis conditions are also set forth in Table I. Detailed descriptions of the test methods and properties as well as individual sample results are given below. Standard deviations ($\sigma$) associated with each property are listed so that the statistical significance of differences in the two products can be discerned.

TABLE I

| EMD Properties | EMD of the Present Invention (12 samples) | Prior Art EMD (18 samples) |
| --- | --- | --- |
| AA-Cell Discharge Capacity at 1 Watt Discharge Rate (mAh/g) | 68.2 σ = 4.4 | 63.4 σ = 7.0 |
| AA-Cell Discharge Energy at 1 Watt Discharge Rate (mWh) | 755 σ = 19 | 637 σ = 6.9 |
| Intrinsic Discharge Capacity (mAh/g) | 254.6 σ = 2.0 | 248.8 σ = 3.6 |
| Initial Open Circuit Voltage (V vs. Zn) | 1.639 σ = 0.006 | 1.623 σ = 0.012 |
| Compressed Density (g/cm³) | 3.162 σ = 0.035 | 3.080 σ = 0.021 |

From Table I it can be seen that the properties of the high discharge capacity EMD produced in accordance with the methods of this invention are considerably better than the properties of high discharge capacity EMD produced using prior art methods. For example, the higher 1-watt discharge capacity and energy translate into longer running times in high rate applications, while the higher intrinsic discharge capacity ensures a greater capacity/running time at lower-rate applications. The greater initial open circuit voltage is valued by battery makers (and is part of the reason for the greater capacities). The compressed density of the EMD is higher, which is very important from the standpoint of its use in batteries, i.e., more EMD can be placed in each cell.

A preferred method of this invention for producing EMD having a high discharge capacity at high discharge rates by electrolysis in an electrolytic cell having cathodic and anodic electrodes disposed therein is comprised of the steps of maintaining a heated aqueous electrolyte solution comprising sulfuric acid and manganese sulfate in said electrolytic cell, the solution having manganese sulfate therein in an amount whereby manganese ion is present in the range of from about 5 to about 50 grams of manganese ion per liter of solution; and applying electric current to the electrodes whereby the anodic electrode current density is in the range of from about 2.5 to about 6 amperes per square foot and the high discharge capacity electrolytic manganese dioxide produced is deposited on the anodic electrode.

A more preferred method of the present invention comprises the steps of maintaining an aqueous solution comprised of sulfuric acid and manganese sulfate in the electrolytic cell at a temperature in the range of from about 95° C. to about 98° C., the solution having sulfuric acid therein in an amount in the range of from about 20 to about 60 grams of sulfuric acid per liter of solution and having manganese sulfate therein in an amount whereby manganese ion is present in the range of from about 5 to about 50 grams of manganese ion per liter of solution; and applying electric current to the electrodes whereby the anodic electrode current density is in the range of from about 2.5 to about 4.5 amperes per square foot and the high discharge capacity electrolytic manganese dioxide produced is deposited on the anodic electrode.

The most preferred method of the present invention for producing EMD having a high discharge capacity at high discharge rates by electrolysis in an electrolytic cell containing cathodic and anodic electrodes comprises the steps of maintaining an aqueous solution comprised of sulfuric acid and manganese sulfate in the electrolytic cell at a temperature in the range of from about 95° C. to about 98° C., the electrolyte solution having sulfuric acid therein in an amount in the range of from about 25 to about 40 grams of sulfuric acid per liter of solution, having manganese sulfate therein in an amount whereby manganese ion is present in the range of from about 5 to about 20 grams of manganese ion per liter of solution, the amount of sulfuric acid in the electrolyte solution being greater than or equal to two times the amount of manganese ion therein; and applying electric current to the electrodes whereby the anodic electrode current density is in the range of from about 2.5 to about 3.5 amperes per square foot and the high discharge capacity EMD produced is deposited on the anodic electrode.

The EMD of this invention has a discharge capacity in an AA-cell at 1 watt discharge rate of about 68.2 mAh/g-EMD and a discharge energy at a 1 watt discharge rate of about 755 mWh.

EXPERIMENTAL PROCEDURES

Sample Preparation: EMD was deposited in bench cells that contained a titanium anode, two copper cathodes, and an aqueous electrolyte of high purity manganese sulfate ($MnSO_4$) and sulfuric acid ($H_2SO_4$). The cell consisted of a 4-liter battery jar, which contained the vertically suspended electrodes. The anode was a corrugated sheet of titanium 25 cm×9.2 cm, and each of the two opposing cathodes consisted of two copper plates, 25 cm×2 cm. Deposition for each test was conducted continuously for several weeks, the electrode reactions being $$Mn^{2+}+2H_2O \rightarrow MnO_2(EMD)+4H^++2e \quad \text{(anode)}$$

$$2H^++2e \rightarrow H_2 \quad \text{(cathode)}$$

In order to maintain constant electrolyte composition in the cell throughout each test, a concentrated solution of weakly acidic $MnSO_4$ was circulated continuously into the cell and electrolyte was removed by way of an overflow. The electrolyte concentration was monitored daily, and stayed within 1 g/l of the target $Mn^{2+}$ and acid concentrations. Temperature in the cell was maintained by means of an immersion heater coupled with a thermoregulator. A thin layer of paraffin was maintained on top of the electrolyte to prevent evaporation. Current was supplied to the electrodes by means of a constant current power supply. Deposition cycles were generally three weeks. However, for many of the higher current density tests, the time was two weeks or less; also, for several very low current density tests, the deposition time was longer than three weeks. There is no indication that product quality varied with deposition time between 2 and 3 weeks. Thus, it was assumed that properties of the product depend only on the deposition parameters coupled with random imprecision.

At the end of the deposition time, each anode was soaked in hot water to remove the paraffin, and then the deposit was removed from the titanium anode, crushed, ground, screened, blended and neutralized with a NaOH solution to pH 7. The final product had the following particle size distribution: 9% −100/+200 mesh, 25% −200/+325 mesh and 66% −325 mesh.

More than 50 laboratory EMD samples were deposited over a wide range of deposition parameters, i.e., current density (i), temperature (T), sulfuric acid concentration ($[H_2SO_4]$) and $Mn^{2+}$-ion concentration ($[Mn^2]$) After the trend of battery performance vs. deposition parameters became apparent, several pilot cells of commercial height but scaled down width and thickness were constructed, and product was deposited at favorable deposition parameters according to this invention. Care was taken to control the deposition so that the conditions did not vary over the plating cycle. Then the EMD anodes were harvested and finished as they had been in the case of laboratory cells. Additionally, several EMD samples from Kerr-McGee Chemical Corporation's production facility were selected for study, to confirm that the deposition parameters in the laboratory cells scaled commercially.

AA-Cell Tests: All of the above samples were evaluated in AA-size cylindrical cells, which were assembled in the laboratory from commercial hardware. First, the EMD was blended with Lonza KS-44 graphite and 9M KOH solution to form a cathode mix, the proportions by weight being EMD/graphite/9M KOH=85.8/7.3/6.9. These mixes were next formed into cathodes to be pressed into the steel cells. The insides of the steel cell walls were pre-plated with nickel and pre-coated with a carbon slurry before the cathodes were pressed into the cell. This was done to improve cathode-cell electrical contact. The cathode in each case was of constant thickness and constant height (and therefore of constant volume). The contacts to the battery terminals were made by conventional means. Each cell also contained an anode composed of a zinc gel and a separator. Finally, the cells were closed in a manner analogous to that used with commercial alkaline AA cells.

The newly constructed AA cells were allowed to rest (equilibrate) for two to three days, and then were connected to a computerized Maccor battery test system and discharged at a rate of 1 watt. The discharge capacities and energies were determined at a cutoff voltage of 0.90V. Cells were made and discharged in weekly batches, with five cells per EMD sample and five EMD samples per week. Since many weeks were required to test all the EMD's, one sample was used as an internal standard and tested weekly along with the test samples for that week. The mean discharge energy (as well as the closely related discharge capacity) for the standard fluctuated somewhat from week to week, but averaged 0.675 Wh. The mean result for all cells of each test sample was divided by the mean result for the standard that was discharged in the same batch. This yielded a relative 1-watt discharge energy for each test sample.

Half-cell Tests: Some of the samples were discharged in flooded half-cells. In "half-cell tests" the EMD is discharged and its potential is measured with respect to a fixed reference electrode. Thus, all the potential change is associated with the EMD discharge, as opposed to the full-cell (i.e., AA-cell) tests, in which the voltage change is shared by both the EMD cathode and zinc anode. Flooded half-cell tests are not influenced by the balance between anode, cathode and electrolyte. Accordingly, these tests were conducted to complement the AA-cell tests. The test cathode consisted of a nickel screen, into which was pressed a blended mixture of EMD, graphite, Teflon powder (as binder), and 9M KOH in the ratio EMD/graphite/Teflon/electrolyte=8.0/1.5/0.5/1.0. The cathode, having a diameter of 1.4 cm, contained a constant weight of EMD in each case, i.e., 0.727 g, and was approximately 1.9 mm thick. This electrode was suspended in a laboratory cell flooded with 9M KOH and discharged against an anode while its potential was measured against a zinc reference electrode. Discharge current was 100 mA/g-EMD and was supplied by a computerized battery test unit.

Analytical Characterization of EMD Samples: The following physical, chemical and electrochemical properties of each EMD sample were determined: BET surface area, pore volume, pore-size distribution, compressed density, open-circuit voltage in 9M KOH solution, and intrinsic discharge capacity. Additionally, many of the samples were X-rayed using the powder diffractometer method, and some were also analyzed for percent Mn, $MnO_2$ and $+110°$ C. water (structural water). Method descriptions and/or references are given below.

Surface Area, Pore Volume and Pore Size Distribution: The samples were outgassed at 150° C. for 7 hr. in vacuum, and then the sorption measurements were made with a Quantachrome Autosorb 6 instrument using Quantachrome software Autosorb for Windows, Version 1.1. Total pore volume ($cm^3$/kg) was determined from the nitrogen adsorbed as the pressure increased from vacuum to 99.6% of atmospheric pressure, which corresponded to a maximum pore diameter of ~4500 Å. Pore volumes were also calculated over three ranges of pore diameter, i.e., 12–30 Å, 30–42 Å and 42–400 Å.

Compressed Density: A cathode mix consisting of 83% dried EMD, 11% KS-44 graphite (Lonza) and 6% 7.2M KOH was compacted into a cylindrical pellet between punches in a one-inch-diameter die. After compaction at 10,000 lb. force, the thickness of the pellet center was measured with a micrometer and the density of the pellet was calculated. The test was conducted in triplicate on each sample, and the results averaged.

Initial Open Circuit Voltage and Intrinsic Discharge Capacity: A cylindrical laboratory cell was assembled from a cathode of 22% EMD, 65% graphite (KS-44 by Lonza) and 13% 9M KOH, and an anode of zinc wire with a separator between.

Cathode mix containing 1.000 g EMD (at 1.6% moisture) was pressed into a cylindrical shape onto the steel base of the cell, which also acted as current collector. The cell was flooded with 9M KOH, and the zinc anode was added, the quantity of zinc being much greater stoichiometrically than the EMD. After the open-circuit voltage stabilized (at the initial open circuit voltage, IOCV), the cell was discharged at a constant current of 20 mA per gram of EMD. The intrinsic discharge capacity (in mAh/g-EMD) was determined as the capacity to a cutoff voltage of 1.000V. Three cells were assembled from each sample as well as from an EMD sample used as an internal standard with each batch of cells. Therefore, all IOCV's and intrinsic capacities are means of the triplicate tests and are referenced to the internal standard tested at the same time. The method is detailed in the following reference: S. F. Burkhardt, in *Handbook of Manganese Dioxides, Battery Grade*, ed. by D. Glover, B. Schumm, Jr., and A. Kozawa, IBA, Inc., Cleveland, Ohio, 1989, pp. 217–236.

X-ray Diffraction (Q-Ratio): An XRD scan was made of each sample using a Siemens D-500 X-ray diffractometer with $CuK\alpha_1$ radiation and high resolution techniques. Scan rates ranged from 0.1 to 0.6 degrees 2θ per minute. Peak heights, corrected for background, were determined at $2\theta \cong 22°$ and 37°, which are the predominant γ-MnO2 and ε-$MnO_2$ peaks, respectively. The ratio of these peak heights (22°/37°) was determined as the Q-ratio. Results were found to be independent of scan rate.

Percent Structural Water or +110° C. Water: The samples were first dried overnight at 110° C. Then the water driven from the sample at 750° C. was determined by means of a Karl Fischer titrator. Each sample was analyzed in triplicate, the individual determinations being conducted on different days.

Percent $MnO_2$ and Mn: The $MnO_2$ was determined trimetrically using $FeSO_4$. First, an EMD sample is dissolved in an excess of standard acidic $FeSO_4$ solution to form $Mn^{2+}$ ions. Then, the excess $Fe^{2+}$ ions are back-titrated with standard permanganate ($KMnO_4$) solution. This method assumes that all oxidative power of the EMD is due to Mn(IV) or $MnO_2$. Total Mn was determined by first dissolving EMD with a $Fe^{2+}$ ion solution and then titrating the resultant $Mn^{2+}$ ions in neutral pyrophosphate solution with standard permanganate solution. In this titration the $Mn^{2+}$ ions are titrated exactly to $Mn^{3+}$ ions. Each sample was analyzed in triplicate, the individual determinations being conducted on different days. Reference: *Handbook of Manganese Dioxides, Battery Grade*, ed. by D. Glover, B. Schumm, Jr., and A. Kozawa, IBA, Inc., Cleveland, Ohio. 1989, pp. 28–38.

TEST RESULTS

Table II below lists the EMD samples (first column) along with the deposition parameters ($2^{nd}$ through $5^{th}$ columns), relative AA-cell 1-watt discharge energies ($6^{th}$ column), and the physical, electrochemical and chemical properties of each (the remaining columns). The table is arranged in order of increasing BET surface area of the EMD (top-to-bottom). The sample used as the comparison standard in AA-cell tests was No. 41.

Two samples, Nos. 2 and 7, were deposited in a so-called slurry cell, in which manganese oxide particulates were suspended in the deposition bath. In such type of deposition, the EMD surface is much rougher than normal, making the real current density much less than the geometrical or apparent current density. The reason for including samples 2 and 7 in the table was to provide an ample data base for samples with very high compressed density. This will be made apparent in some of the examples below.

TABLE II

Summary of Samples, Deposition Conditions and Performance Characteristics

| EMD Sample # | Deposition Conditions | | | | 1-Watt | BET | | | Intrinsic | | | | | | | | | |
|---|---|---|---|---|---|---|---|---|---|---|---|---|---|---|---|---|---|---|
| | Current Density (A/ft²) | Deposition Temp (°C.) | Acid Conc (g/l) | Mn Conc (g/l) | Discharge Energy (% base) | Surface Area (m²/g) | Compressed Density (g/cm³) | IOCV (V vs. Zn) | Discharge Capacity (mAh/g) | Q Ratio | Structural H2O (%) | Mn (%) | MnO2 (%) | Pore Volume (cc/g) | 12 to 30 Ang. Pore Volume (cc/kg) | 30 to 42 Ang. Pore Volume (cc/kg) | 42 to 400 Ang. Pore Volume (cc/kg) |
| 1 | 0.5 | 95 | 30 | 30 | 65.3 | 8.2 | 3.24 | 1.557 | 201.6 | 1.290 | 2.00 | 61.4 | 94.7 | 0.024 | 0.6 | 4.6 | 9.6 |
| 2 | 12.0* | 95* | 30* | 30* | 74.9 | 9.7 | 3.29 | 1.585 | 222.9 | 0.629 | 2.72 | 60.9 | 93.4 | 0.025 | 1.4 | 3.9 | 6.9 |
| 3 | 1.0 | 95 | 30 | 30 | 73.7 | 13.9 | 3.22 | 1.577 | 234.2 | 0.855 | 2.75 | 60.9 | 91.9 | 0.023 | 1.9 | 6.6 | 8.5 |
| 4 | 3.4 | 97 | 12 | 9 | 100.1 | 16.7 | 3.22 | 1.598 | 232.0 | 0.548 | — | — | — | 0.028 | 3.1 | 7.6 | 9.8 |
| 5 | 3.4 | 97 | 30 | 10 | 115.7 | 17.0 | 3.19 | 1.632 | 253.1 | — | — | — | — | 0.022 | 5.4 | 6.6 | 6.3 |
| 6 | 3.0 | 95 | 31 | 29 | 108.9 | 18.9 | 3.14 | 1.610 | 252.4 | 0.730 | 3.25 | 60.2 | 91.7 | 0.024 | 3.1 | 10.1 | 6.2 |
| 7 | 9.0* | 95* | 30* | 33* | 89.3 | 19.5 | 3.23 | 1.599 | 239.0 | 0.949 | 3.37 | — | 92.7 | 0.026 | 4.2 | 6.6 | 7.2 |
| 8 | 3.4 | 97 | 19 | 15 | 105.2 | 19.6 | 3.19 | 1.605 | 244.2 | — | — | — | — | 0.028 | 4.0 | 7.7 | 8.9 |
| 9 | 3.4 | 97 | 19 | 5 | 103.0 | 20.5 | 3.20 | 1.644 | 256.3 | 0.500 | — | — | — | 0.024 | 4.7 | 6.4 | 6.3 |
| 10 | 4.0 | 96 | 14 | 28 | 91.6 | 20.8 | 3.15 | 1.583 | 227.6 | 0.395 | 2.76 | 60.7 | 92.1 | 0.034 | 3.8 | 10.5 | 13.4 |
| 11 | 3.4 | 97 | 26 | 10 | 109.6 | 21.2 | 3.18 | 1.632 | 250.3 | — | — | — | — | 0.028 | 5.7 | 6.5 | 6.3 |
| 12 | 3.4 | 96 | 30 | 9 | 114.4 | 21.7 | 3.18 | 1.646 | 257.4 | — | — | — | — | 0.024 | 5.3 | 6.4 | 5.0 |
| 13 | 3.4 | 97 | 29 | 9 | 110.7 | 22.1 | 3.18 | 1.642 | 257.7 | — | — | — | — | 0.037 | 5.5 | 6.1 | 8.4 |
| 14 | 3.0 | 95 | 31 | 10 | 109.8 | 22.2 | 3.11 | 1.642 | 255.8 | 0.500 | — | — | — | 0.025 | 5.1 | 2.4 | 8.8 |
| 15 | 2.5 | 96 | 25 | 11 | 115.9 | 22.4 | 3.16 | 1.626 | 253.3 | 0.659 | 3.22 | 60.4 | 91.8 | 0.024 | 5.3 | 6.3 | 5.6 |
| 16 | 3.4 | 96 | 29 | 9 | 115.2 | 22.4 | 3.22 | 1.641 | 256.1 | 0.626 | 3.32 | 60.1 | 92.0 | 0.024 | 5.8 | 6.6 | 5.0 |
| 17 | 3.0 | 96 | 37 | 30 | 98.0 | 23.0 | 3.16 | 1.613 | 248.4 | — | — | — | — | 0.029 | 5.5 | 9.5 | 7.9 |
| 18 | 3.0 | 95 | 30 | 32 | 95.6 | 23.3 | 3.12 | 1.608 | 253.2 | — | — | — | — | 0.029 | 4.6 | 10.4 | 6.9 |
| 19 | 3.0 | 95 | 30 | 32 | 102.0 | 23.3 | 3.12 | 1.608 | 253.2 | 0.967 | — | — | — | 0.029 | 4.6 | 10.4 | 6.9 |
| 20 | 3.0 | 95 | 30 | 10 | 111.3 | 23.8 | 3.13 | 1.641 | 253.8 | — | — | — | — | 0.027 | 4.1 | 7.1 | 6.0 |
| 21 | 3.0 | 96 | 30 | 10 | 108.9 | 24.1 | — | — | 253.8 | 0.547 | — | — | — | 0.030 | 4.2 | 6.6 | 7.8 |
| 22 | 4.0 | 95 | 30 | 24 | 107.5 | 24.4 | 3.15 | 1.625 | 250.8 | — | — | — | — | 0.027 | 4.7 | 8.4 | 6.8 |
| 23 | 3.4 | 96 | 30 | 10 | 111.0 | 24.9 | 3.16 | 1.643 | 254.6 | 0.555 | — | — | — | 0.027 | 6.0 | 5.9 | 5.9 |
| 24 | 3.0 | 97 | 35 | 10 | 111.0 | 25.4 | 3.17 | 1.639 | 254.6 | — | 3.30 | 59.9 | 91.9 | 0.029 | 6.1 | 6.4 | 6.5 |
| 25 | 4.2 | 96 | 29 | 11 | 101.0 | 26.0 | 3.13 | 1.634 | 248.1 | — | — | — | — | 0.031 | 5.2 | 9.0 | 7.9 |
| 26 | 5.0 | 95 | 20 | 10 | 103.4 | 26.5 | 3.12 | 1.636 | 253.2 | — | — | — | — | 0.032 | 6.7 | 8.0 | 9.0 |
| 27 | 3.4 | 97 | 56 | 21 | 108.0 | 27.0 | 3.13 | 1.634 | 251.3 | — | — | — | — | 0.032 | 7.0 | 8.6 | 8.2 |
| 28 | 5.0 | 95 | 30 | 19 | 98.3 | 27.8 | 3.06 | 1.636 | 252.6 | 0.8 | — | — | — | 0.032 | 7.8 | 8.2 | 6.9 |
| 29 | 6.0 | 96 | 36 | 40 | 99.3 | 28.9 | 3.07 | 1.603 | 248.2 | — | — | — | — | 0.034 | 5.4 | 16.1 | 6.4 |
| 30 | 5.8 | 96 | 37 | 31 | 95.9/102.0 | 29.0 | 3.09 | 1.624 | 248.6 | 0.6 | — | — | — | 0.032 | 7.6 | 12.4 | 7.5 |
| 31 | 3.0 | 96 | 70 | 70 | 96.4 | 29.1 | 3.06 | 1.619 | 253.9 | — | — | — | — | — | 7.1 | 12.7 | 7.2 |
| 32 | 5.8 | 96 | 37 | 31 | 97.2/105.2 | 29.6 | 3.10 | 1.619 | 251.4 | 0.631 | 3.53 | 60.6 | 91.4 | 0.046 | 6.5 | 14.1 | 10.5 |
| 33 | 3.0 | 95 | 69 | 71 | 101.9 | 30.0 | 3.06 | 1.617 | 253.4 | 0.866 | 3.21 | 60.1 | 91.3 | 0.033 | 6.0 | 11.8 | 8.4 |
| 34 | 3.5 | 97 | 40 | 44 | 96.5 | 30.1 | 3.12 | 1.612 | 250.6 | 0.673 | 3.26 | 61.7 | 91.1 | 0.034 | 8.1 | 11.7 | 7.5 |
| 35 | 3.0 | 95 | 41 | 20 | 107.9 | 30.4 | 3.12 | 1.643 | 255.0 | — | — | — | — | 0.030 | 5.9 | 6.8 | 5.4 |
| 36 | 5.8 | 96 | 37 | 31 | 104.0 | 30.9 | 3.10 | 1.619 | 252.5 | — | — | — | — | 0.048 | 7.1 | 14.3 | 10.5 |
| 37 | 5.0 | 95 | 41 | 41 | 98.8 | 31.8 | 3.06 | 1.629 | 252.4 | — | — | — | — | 0.036 | 8.4 | 12.1 | 7.5 |
| 38 | 3.4 | 96 | 31 | 31 | 100.0 | 31.8 | 3.08 | 1.619 | 251.7 | — | — | — | — | 0.049 | 7.3 | 13.5 | 10.0 |
| 39 | 5.8 | 96 | 37 | 31 | 103.0 | 32.1 | 3.08 | 1.619 | 251.4 | — | — | — | — | 0.047 | 7.6 | 13.6 | 10.5 |
| 40 | 3.0 | 95 | 61 | 20 | 98.2 | 33.5 | 3.09 | 1.649 | 250.6 | 0.538 | — | — | — | 0.034 | 7.6 | 6.8 | 8.8 |
| 41 | 5.8 | 95 | 37 | 31 | 100.0 | 33.6 | 3.07 | 1.617 | 250.4 | 0.602 | 3.37 | 60.6 | 90.7 | 0.048 | 7.3 | 13.9 | 10.8 |
| 42 | 5.8 | 95 | 44 | 27 | 94.2 | 33.9 | 3.10 | 1.634 | 250.3 | — | — | — | — | 0.038 | 9.0 | 10.2 | 8.6 |
| 43 | 6.0 | 95 | 20 | 13 | 94.5 | 34.1 | 3.07 | 1.631 | 250.2 | 0.430 | — | — | — | 0.039 | 8.3 | 8.4 | 10.2 |

TABLE II-continued

Summary of Samples, Deposition Conditions and Performance Characteristics

| EMD Sample # | Deposition Conditions | | | 1-Watt | BET | | | Intrinsic | | | | | | | | |
|---|---|---|---|---|---|---|---|---|---|---|---|---|---|---|---|---|
| | Current Density (A/ft²) | Deposition Temp (°C) | Acid Conc (g/l) | Mn Conc (g/l) | Discharge Energy (% base) | Surface Area (m²/g) | Compressed Density (g/cm³) | IOCV (V vs. Zn) | Discharge Capacity (mAh/g) | Q Ratio | Structural H2O (%) | Mn (%) | MnO2 (%) | Pore Volume (cc/g) | 12 to 30 Ang. Pore Volume (cc/kg) | 30 to 42 Ang. Pore Volume (cc/kg) | 42 to 400 Ang. Pore Volume (cc/kg) |
| 44 | 5.8 | 95 | 49 | 24 | 91.8 | 34.1 | 3.11 | 1.633 | 249.2 | — | — | — | — | 0.035 | 8.9 | 9.5 | 10.8 |
| 45 | 5.0 | 97 | 41 | 10 | 103.4 | 34.9 | 3.11 | 1.643 | 251.0 | — | — | — | — | 0.035 | 8.6 | 8.3 | 7.9 |
| 46 | 5.8 | 97 | 36 | 32 | 94.9 | 35.6 | 3.08 | 1.626 | 250.4 | — | — | — | — | 0.036 | 9.6 | 12.2 | 6.8 |
| 47 | 5.8 | 95 | 37 | 30 | 97.7 | 35.9 | 3.09 | 1.627 | 248.1 | — | — | — | — | 0.040 | 9.7 | 11.5 | 9.4 |
| 48 | 5.8 | 95 | 49 | 24 | 101.2 | 36.1 | 3.11 | 1.633 | 249.2 | — | — | — | — | 0.035 | 8.9 | 9.9 | 8.0 |
| 49 | 7.5 | 95 | 18 | 31 | 94.9 | 36.3 | 2.98 | 1.611 | 243.3 | 0.585 | — | — | — | 0.043 | 8.0 | 17.3 | 11.6 |
| 50 | 5.8 | 95 | 48 | 26 | 94.1 | 37.2 | 3.09 | 1.634 | 249.6 | 0.559 | — | — | — | 0.042 | 10.1 | 10.8 | 9.8 |
| 51 | 7.5 | 95 | 19 | 71 | 91.1 | 37.5 | 2.94 | 1.606 | 242.6 | — | — | — | — | 0.043 | 7.9 | 14.7 | 12.9 |
| 52 | 6.0 | 95 | 30 | 91 | 101.6 | 40.6 | 3.05 | 1.609 | 245.7 | — | — | — | — | 0.042 | 9.4 | 15.4 | 8.5 |
| 53 | 7.5 | 95 | 20 | 71 | 96.0 | 41.2 | 2.94 | 1.605 | 243.4 | 0.488 | — | — | — | 0.044 | 8.5 | 19.6 | 8.6 |
| 54 | 5.8 | 97 | 39 | 11 | 94.9 | 43.7 | 3.05 | 1.645 | 248.6 | 0.408 | 3.60/3.72 | 59.9 | 91.1 | 0.040 | 10.5 | 12.0 | 8.7 |
| 55 | 6.0 | 95 | 52 | 71 | 86.3 | 45.3 | 3.04 | 1.628 | 245.7 | 0.537 | — | — | — | 0.042 | 12.5 | 12.8 | 8.0 |
| 56 | 9.0 | 95 | 22 | 52 | 77.9 | 45.5 | 3.01 | 1.600 | 241.4 | 0.425 | — | — | — | 0.052 | 9.3 | 21.2 | 14.2 |
| 57 | 7.5 | 93 | 92.6 | 7.5 | 84.4 | 45.7 | 2.95 | 1.608 | 243.7 | 0.447 | 3.53 | 60.4 | 90.2 | 0.061 | 8.2 | 22.4 | 15.8 |
| 58 | 7.5 | 93 | 92.6 | 7.5 | 87.6 | 46.9 | 2.95 | 1.608 | 243.7 | 0.451 | — | — | — | 0.064 | 8.5 | 22.7 | 16.1 |
| 59 | 5.8 | 97 | 69 | 70 | 96.0 | 52.0 | — | 1.600 | 236.3 | — | — | — | — | 0.047 | 13.8 | 13.6 | 13.0 |
| 60 | 7.5 | 84 | 84 | 7.5 | 60.0 | 86.4 | 2.56 | 1.577 | 216.2 | — | — | — | — | 0.010 | 17.7 | 40.1 | 37.8 |
| 61 | 7.5 | 83 | 83 | 7.5 | 51.6 | 97.2 | 2.58 | 1.576 | 214.2 | — | — | — | — | | 21.0 | 35.0 | 34.8 |

*Slurry cells

In order to further illustrate the EMD and methods of the present invention, the following examples are given. In the examples, i=current density, T=temperature, [$H_2SO_4$]=concentration of sulfuric acid and [$Mn^{2+}$]=concentration of $Mn^{2+}$ ions.

EXAMPLE 1

The materials described in the examples of the invention were as good as or better than any other materials tested. In particular, the best materials were deposited at the following conditions: i=2.5–3.5 A/ft$^2$, [$H_2SO_4$]≈30 g/l and [$Mn^{2+}$]≈10 g/l. From visual inspection, Table II indicates that at i<2.5 A/ft$^2$ (the top entries in the table), and at i>6 A/ft$^2$ and/or T<95° C., the product EMD produces a substantially lower discharge energy than at the optimum deposition i and T. For the samples deposited at current densities from 2.5 to 6.0 A/ft$^2$, for which there are numerous samples and significant scatter in the results, a multiple regression was performed of the AA-cell energies vs. the four deposition parameters to de-couple the effects of deposition parameters and the random error in the discharge energies. In this regression, the results for the "standard" sample, No. 41, were given a weight of 20 because this sample was discharged on more than 20 occasions (every week), whereas the other samples were generally discharged on just one occasion. Results of this regression are given by the following expression.

Relative discharge energy at rate of 1 Watt=−2.327−1.686$i$+
0.770T+3.685[$H_2SO_4$]−0.0906[$H_2SO_4$]$^2$+0.00067[$H_2SO_4$]$^3$−
0.345[$Mn^{2+}$]+0.00274[$Mn^{2+}$]$^2$                                              (Eq.1)

This expression yielded a correlation coefficient, R, of 0.794, which indicates a nominally good fit of the data. Several other expressions with respect to the independent variables gave approximately equally good, but no better, correlation coefficient than the above expression. These expressions generally showed the same effects of the parameters. Thus, it appears that the limitations in fitting the data are more because of limitations in the precision of the data than of the misfit between the regression and the experimental energies.

The statistical significance of fitting the various coefficients in Eq. (1) is very high (>98%) except in the case of temperature. Here the significance of fit to the coefficient is only 73%. The significant effects of the deposition parameters are indicated by the coefficients, as follows. The effect of temperature is to increase the discharge energy by 0.77% per degree C. The effect of current density is to decrease the discharge energy by 1.69% for each A/ft$^2$. This is shown in FIG. 1 at chosen electrolyte conditions of T=95° C., [$H_2SO_4$]=30 g/l, and [$Mn^{2+}$]=30 g/l. One observes that decreasing i from 6.0 A/ft$^2$ to 2.5 A/ft$^2$ increases the discharge energy by almost 6%. FIG. 1 does not show i values less than 2.5 A/ft$^2$. Since the discharge energy drops rapidly between 2.5 and 1.0 A/ft$^2$ (Table II), this area was not investigated in detail.

Figure 2:
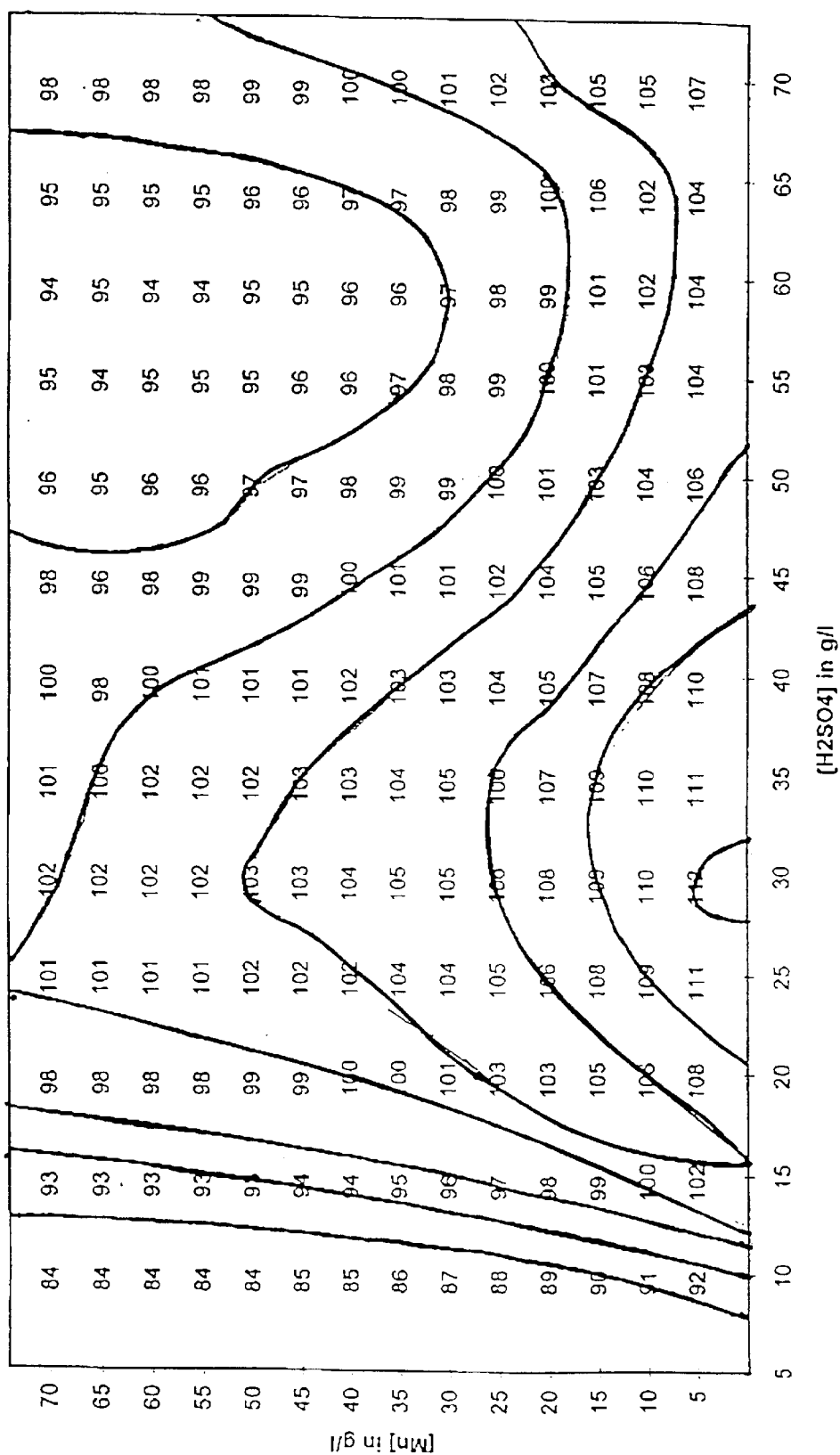
FIG. 2 is a topographical representation of the relative energy in AA cells vs. the $H_2SO_4$ and $Mn^{2+}$ concentrations as obtained from multiple regression of the experimental results (Table II) within the current density range of 2.5–6.0 $A/ft^2$.

FIG. 2 shows the results of Eq. 1 in topographical form for fixed i and T, and variable [$H_2SO_4$] and [$Mn^{2+}$]. Lines are drawn for equal energy intervals of 3% between 91 and 112%. The best energies are observed near 30 g/l $H_2SO_4$ and 5 g/l $Mn^{2+}$. The energy then decreases as either [$H_2SO_4$] or [$Mn^{2+}$] is increased. The energy then increases slightly again at [$H_2SO_4$]>60–65 g/l. These and higher $H_2SO_4$ concentrations are not desired, because they foster passivation of the bare titanium anodes, which raises the cell voltage during deposition and can cause cell shutdown. A significant finding is that the discharge energy is defined by not only the acid and $Mn^{2+}$ concentrations but also the ratio [$H_2SO_4$]/[$Mn^{2+}$], as evidenced from the shapes of the contour lines.

From Eq. (1) and FIGS. 1 and 2 one could define deposition parameters that produce excellent product (arbitrarily chosen as >108% of the energy for the internal standard) and good (arbitrarily chosen as 100–108% of the energy for the internal standard). These conditions are approximately:

Excellent Deposition Conditions:

i=2.5–3.5 A/ft$^2$; T=95–98° C.; [$H_2SO_4$]=25–40 g/l; [$Mn^{2+}$]=5–20 g/l.

Deposition Conditions Good:

i=3.6–6.0 A/ft$^2$; T=95–98° C.; [$H_2SO_4$]=41–50 g/l; [$Mn^{2+}$]=21–50 g/l.

EXAMPLE 2

Example 2 shows that the inventive EMD has superior high-drain battery performance to and also different properties than EMD deposited at prior art conditions. "Prior art EMD's" were taken as all those in Table II for which the deposition current density was 5.8 or 6.0 A/ft$^2$ (18 in number). For the present invention, we use all the samples in Table II that were deposited under the most preferred conditions as defined in Example 1, i.e., 2.5–3.5 A/ft$^2$, 95–98° C., 25–40 g/l $H_2SO_4$ and 5–20 g/l $Mn^{2+}$. This includes Samples 5, 11–16, 20, 21, 23, 24 and 35 (12 in number). The performances and properties of all the samples within each group were averaged to represent the group. Comparison of the inventive EMD's and the prior art EMD's are shown in Table III below in terms of the mean performance features or properties and the standard deviations for the individual values about the means. Several entries in Table III are those shown in Table I.

The inventive EMD's are statistically different from the prior art EMD's in most respects. In several cases the difference in property directly relates to obvious superiority in application, i.e., the higher 1-watt discharge capacity and energy translate into longer running time in high-rate applications; the higher intrinsic discharge capacity ensures a greater capacity at lower-rate applications; the greater initial open circuit voltage is valued by battery makers (and is part of the reason for the greater capacities); and greater compressed density translates into more material being placed in each cell.

The other differences largely verify and define differences in structure, and provide the means by which EMD discharge rates differ. The pores, defined by the BET surface area, the pore volume and the pore volume distribution, are the dislocations and interstitial spaces between solid crystallites and aggregates of crystallites. The prior art EMD's have more such space than the inventive EMD's at all levels (sizes) of interstices. This excess space interferes with proton movement through the EMD during discharge, the latter proton movement being necessary to sustain the electrochemical discharge reaction, which is given by Eq. (2).

$MnO_2+H_2O+e^- \rightarrow MnOOH+OH^-$                                              (2)

The stoichiometric differences, as represented by % $MnO_2$, Mn and structural water, are smaller than the differences in porosity. Nevertheless, these small differences can contribute to the initial open circuit voltage and discharge differences, i.e., the Mn oxidation number (being proportional to % $MnO_2$/%Mn) favors the inventive EMD slightly, since %$MnO_2$ is slightly greater for the inventive material.

TABLE III

| | EMD of the Present Invention (12 samples) | Prior Art EMD (18 samples) |
|---|---|---|
| Deposition Conditions | 2.5–3.5 A/ft$^2$ | 5.8–6.0 A/ft$^2$ |
| | 95–97° C. | 95–97° C. |
| | 15–40 g/l H$_2$SO$_4$ | 20–69 g/l H$_2$SO$_4$ |
| | 5–20 g/l Mn$^{2+}$ | 11–91 g/l Mn$^{2+}$ |
| EMD Properties | | |
| AA-Cell Discharge Capacity at 1 Watt Discharge Rate (mAh/g) | 68.2 σ = 4.4 | 63.4 σ = 7.0 |
| AA-Cell Discharge Energy at 1 Watt Discharge Rate (mWh) | 755 σ = 19 | 637 σ = 6.9 |
| Intrinsic Discharge Capacity (mAh/g) | 254.6 σ = 2.0 | 248.8 σ = 3.6 |
| Initial Open Circuit Voltage (V vs. Zn) | 1.639 σ = 0.006 | 1.623 σ = 0.012 |
| Compressed Density (g/cm$^3$) | 3.162 σ = 0.035 | 3.080 σ = 0.021 |
| % MnO$_2$ | 91.9 σ = 0.1 | 91.1 σ = 0.3 |
| % Mn | 60.1 σ = 0.3 | 60.4 σ = 0.4 |
| % Structural H$_2$O | 3.28 σ = 0.05 | 3.52 σ = 0.15 |
| BET Surface Area (m$^2$/g) | 23.5 σ = 3.2 | 34.8 σ = 4.6 |
| Total Pore Volume (cm$^3$/kg) | 27 σ = 4 | 41 σ = 5 |
| 12–30 A Pore Volume (cm$^3$/kg) | 5.4 σ = 0.07 | 8.9 σ = 2.0 |
| 30–42 A Pore Volume (cm$^3$/kg) | 6.1 σ = 1.2 | 12.5 σ = 2.1 |
| 42–400 A Pore Volume (cm$^3$/kg) | 6.4 σ = 1.3 | 9.3 σ = 1.7 |
| XRD Q-Ratio | 0.58 σ = 0.06 | 0.54 σ = 0.09 |

EXAMPLE 3

Figure 3:
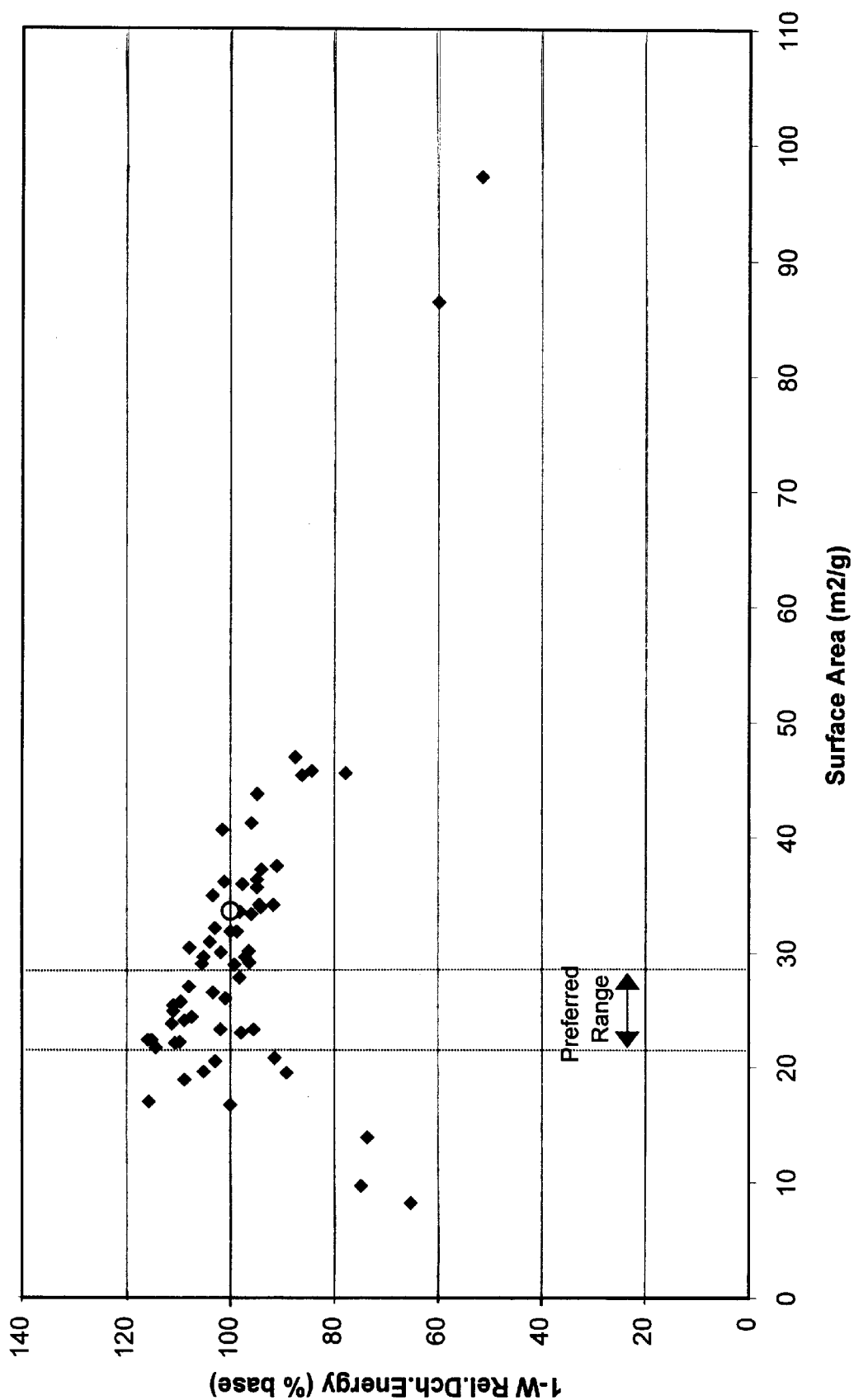
FIG. 3 is a scatter plot of the experimental relative discharge energies in AA cells vs. the BET surface areas of all the EMD samples in Table II. The open circle represents the reference Sample No. 41 in this and subsequent figures.

FIG. 3 shows the experimental AA-cell discharge energies vs. the BET surface areas for all the samples of Table I. Vertical lines are drawn to define a surface-area range within which practically all the excellent EMD's lie (excellent EMD's being arbitrarily defined as earlier, i.e., those yielding AA-cell energies equal to or greater than 108% of Sample 41). All such EMD's were deposited according to the preferred method of the invention. It is observed that the range of excellence does not screen out all sub-excellent materials. Rather, this range is meant to indicate whether or not a material has a high probability of being sub-excellent, by virtue of its surface area lying outside the range of excellence. The range of excellence is approximately 21–29 m$^2$/g. This range excludes one sample in FIG. 3 with a surface area of 17 m$^2$/g and a discharge energy >108%. However, many other samples with surface areas in the range of 17–21 m$^2$/g yield discharge energies less than 108%. Surface areas greater than the range of excellence are dominated by EMD's deposited by prior art of higher current densities than preferred (i.e., i>5 A/ft$^2$) and lower temperatures than preferred (i.e., T<95° C.). Surface areas less than the range of excellence contain EMD's deposited at current densities less than the inventive method (i.e., <2 A/ft$^2$), EMD's deposited from electrolyte with non-preferred acid and/or manganese concentrations, or EMD's deposited from a slurry cell.

EXAMPLE 4

Figure 4:
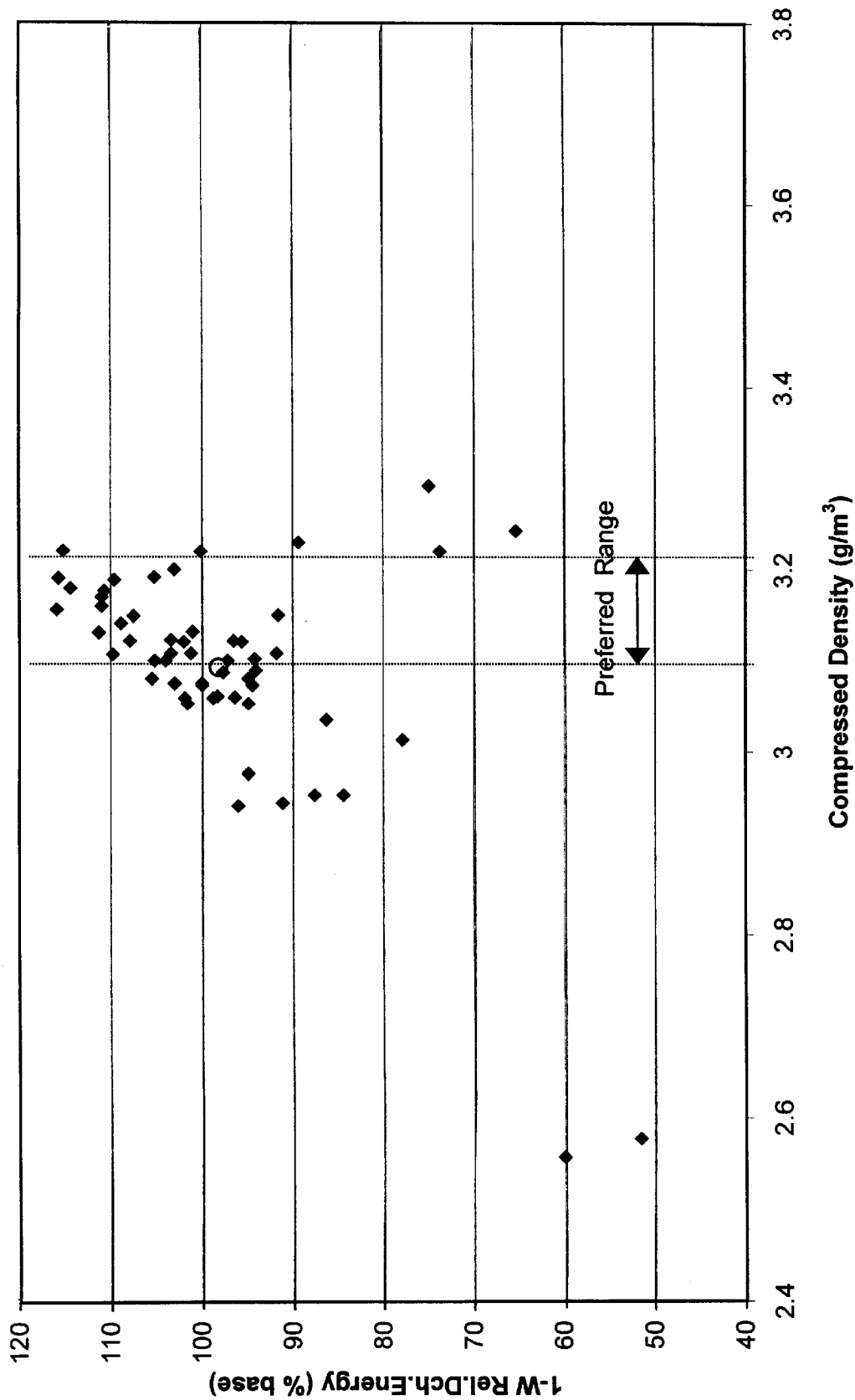
FIG. 4 is a scatter plot of the experimental relative discharge energies in AA cells vs. the compressed densities of the EMD samples.

FIG. 4 shows the experimental AA-cell discharge energies as a function the compressed density for all the samples of Table I. The range of excellence, defined as in Example 3, includes compressed densities between approximately 3.09 and 3.21 g/cm$^3$. Compressed densities below the range of excellence are dominated by the same EMD's that possess surface areas that are too high (FIG. 3); these were deposited by prior art of higher current densities and/or lower temperatures than preferred. Compressed densities greater than the range of excellence contain the same EMD's that were outside the range of excellence on the low-surface-area side, as detailed in Example 3.

EXAMPLE 5

Figure 5:
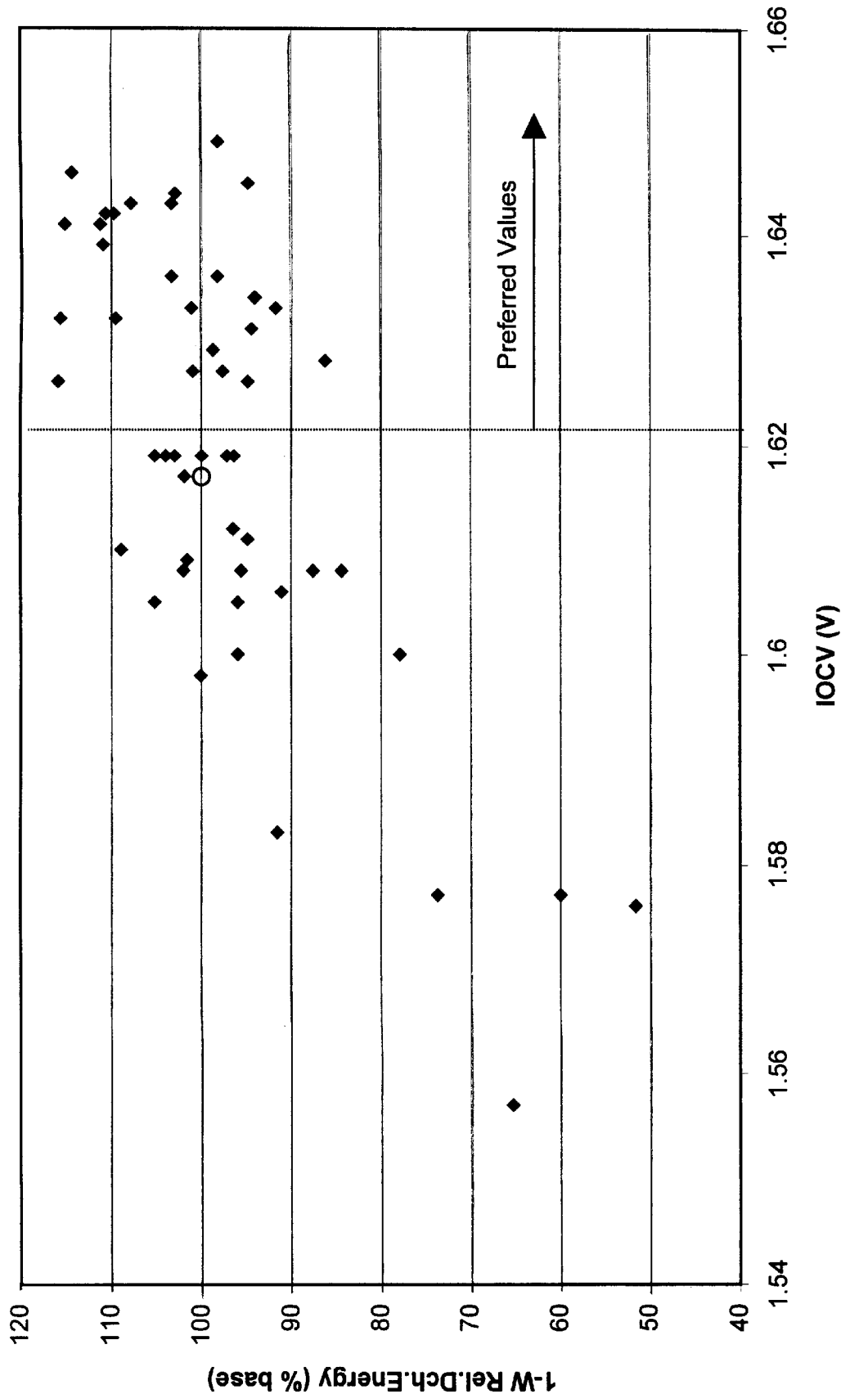
FIG. 5 is a scatter plot of the experimental relative discharge energies in AA cells vs. the initial open circuit voltages of the EMD samples.
Figure 6:
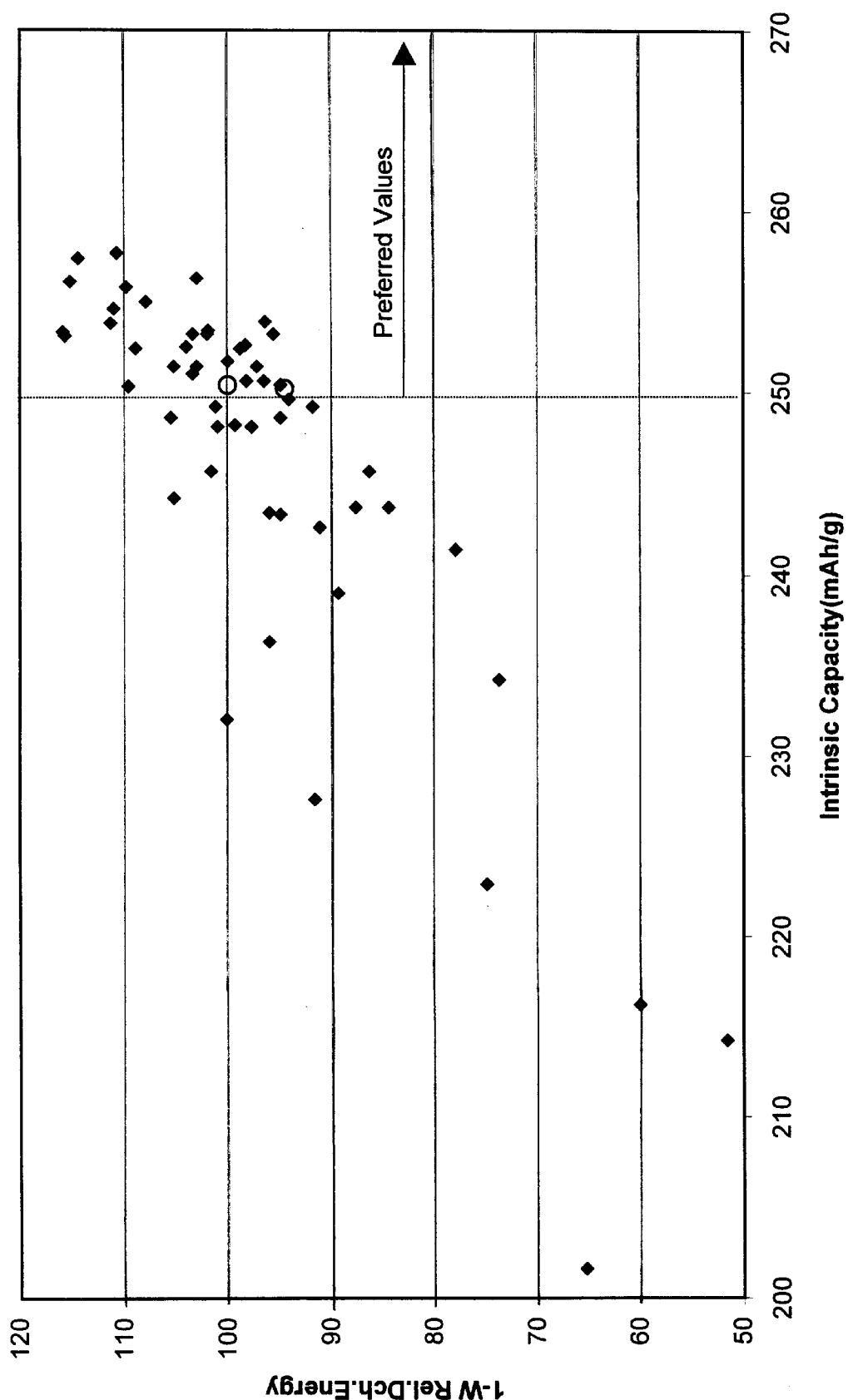
FIG. 6 is a scatter plot of the experimental relative discharge energies in AA cells vs. the intrinsic discharge capacities of the EMD samples.

FIGS. 5 and 6 show the experimental AA-cell discharge energies as functions of the initial open circuit voltages (IOCV's) and intrinsic discharge capacities, respectively, for all the samples of Table I. In these cases the range of excellence starts at approximately 1.62 V (IOCV) or 250 mAh/g (intrinsic capacity) and is unbounded on the high end. The results indicate that samples have little chance of excellence at high drain if their IOCV or intrinsic discharge capacity is less than that of Sample 41 (open circle)

EXAMPLE 6

Figure 7:
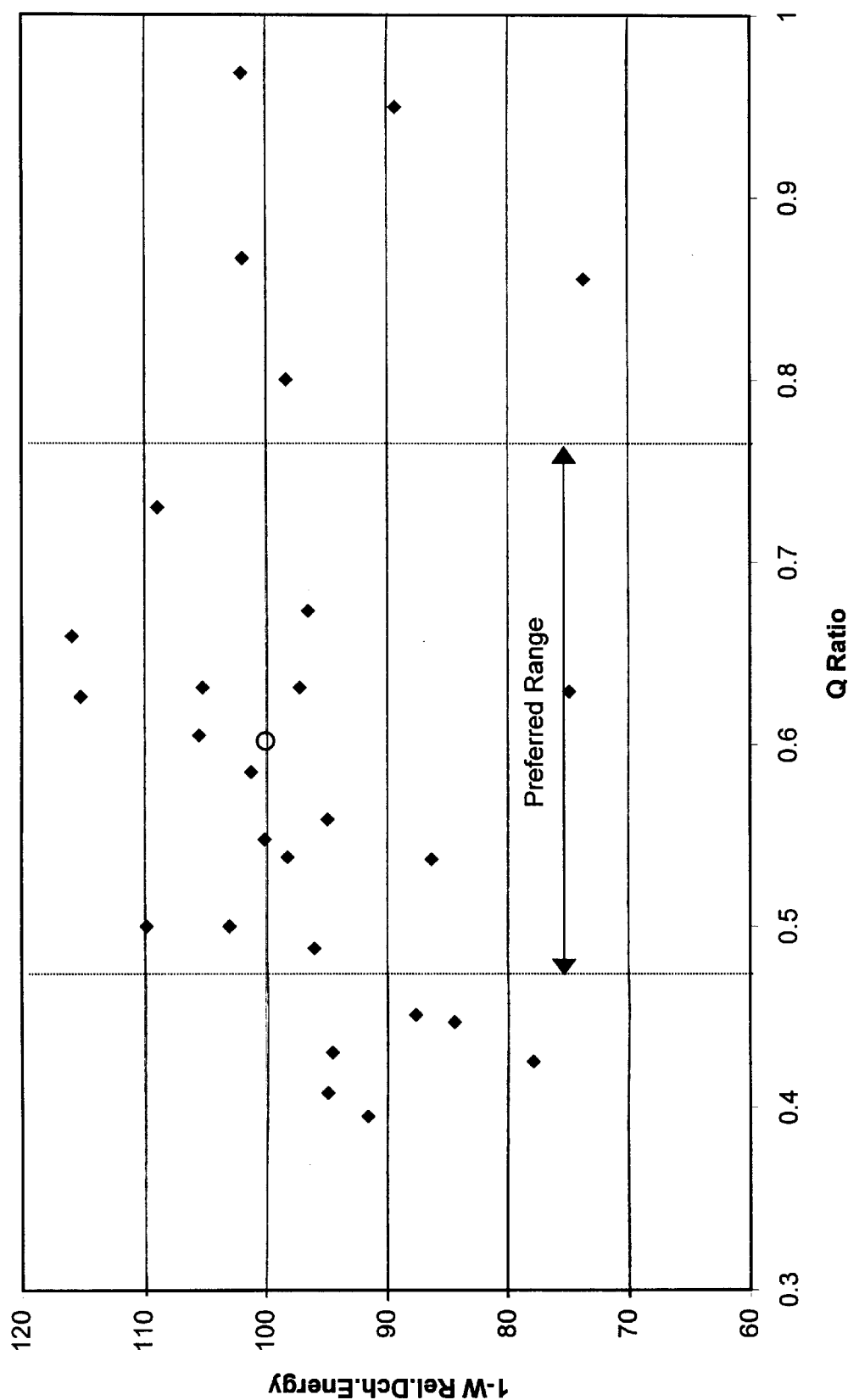
FIG. 7 is a scatter plot of the experimental relative discharge energies in AA cells vs. the Q-ratio of the EMD samples.
Figure 10:
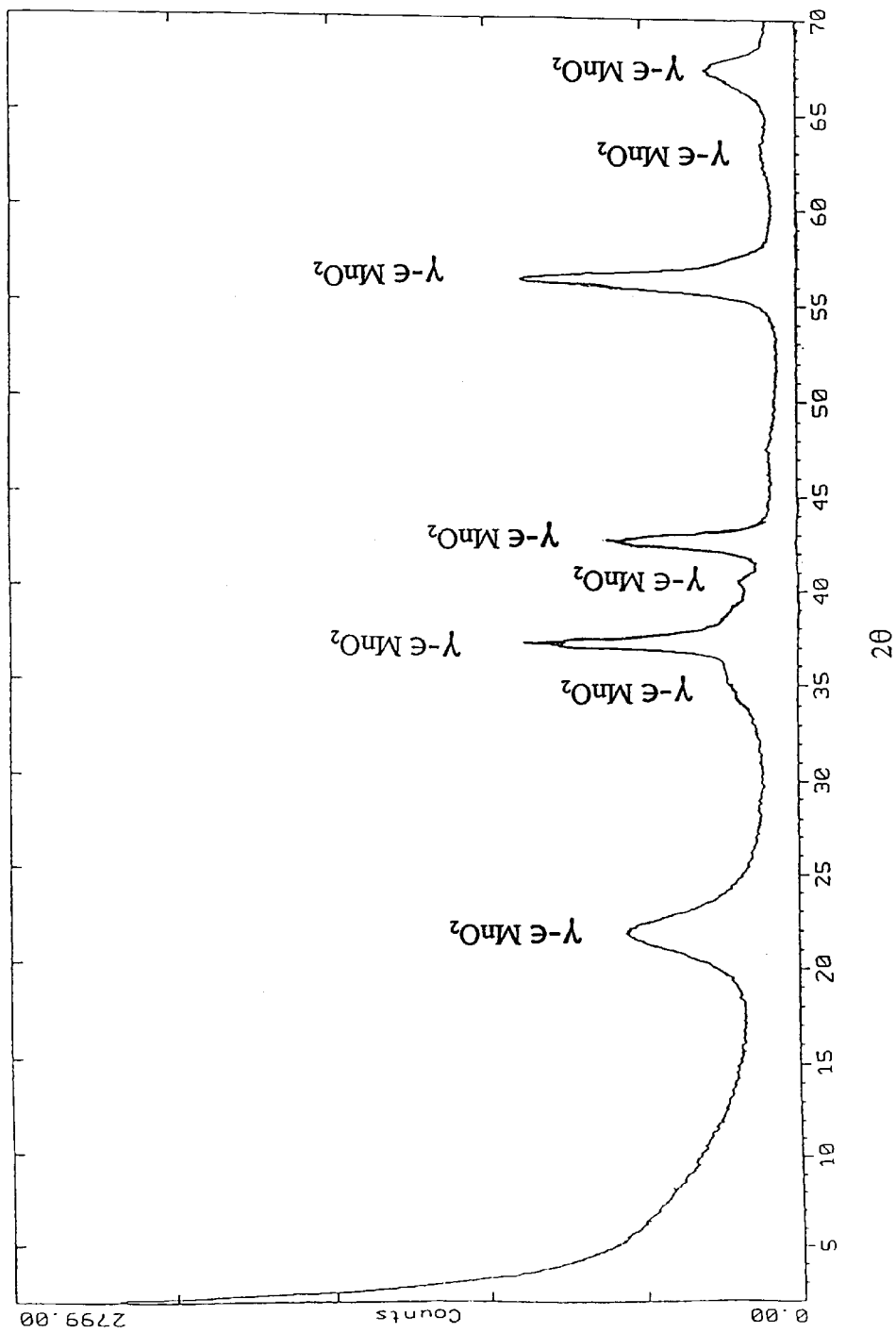
FIG. 10 is an XRD scan of Sample No. 16, deposited under the conditions of the invention, i.e., 3.4 $A/ft^2$, 96° C., 29 g/l $H_2SO_4$ and 9 g/l $Mn^{2+}$.
Figure 11:
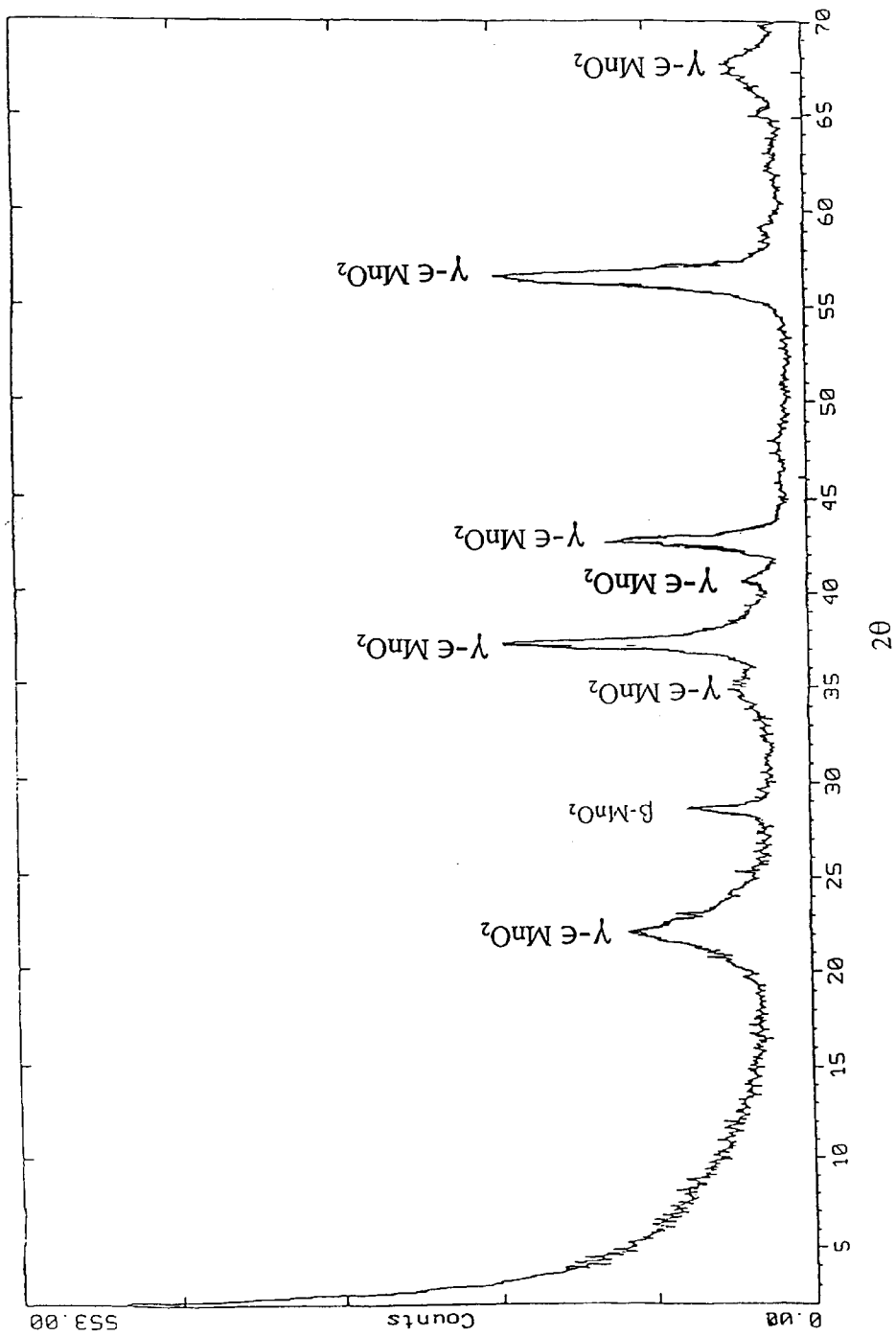
FIG. 11 is an XRD scan of Sample No. 4, deposited at 3.4 A/ft$^2$, 96° C., 12 g/l H$_2$SO$_4$ and 9 g/l Mn$^{2+}$.

The X-ray diffraction (XRD) spectrum for a typical, good EMD is shown in FIG. 10. All the peaks in this spectrum are characteristic of EMD's and have been indexed as representing the continuous crystallographic series between the γ-MnO$_2$ and ε-MnO$_2$ phases. All the members of this series are often collectively termed γ-ε MnO$_2$. The crystallography of such EMD's may be defined further in terms of the γ-MnO$_2$/ε-MnO$_2$ character of the EMD, defined as the relative peak heights of the 220 and 370 peaks (after correction for background). This ratio of peak heights, 220/370, termed the "Q-ratio" is shown in FIG. 7 vs. the experimental AA-cell 1-watt discharge energies for a representative number of the samples. Q-ratios lie between about 0.47 and 0.76 for excellent EMD's. This range also happens to include some prior art EMD's, including Sample 41. EMD's with too high of a Q-ratio were deposited at very low current densities or from a suspension bath. In addition to appropriate Q-ratios, the excellent and good EMD's must show clean γ/ε-MnO$_2$ patterns as shown in FIG. 10, and not show detrimental phases. FIG. 11, for Sample No. 4, exhibits a prominent peak for β-MnO$_2$ at about 28.8°, even though its Q-ratio is 0.55, which falls within the range of excellence. β-MnO$_2$ is a battery-inactive phase in rapid alkaline discharge. Other EMD's deposited from low-acid baths (i.e., <15 g/l H$_2$SO$_4$) also exhibited the β-MnO$_2$ peak.

EXAMPLE 7

Figure 8:
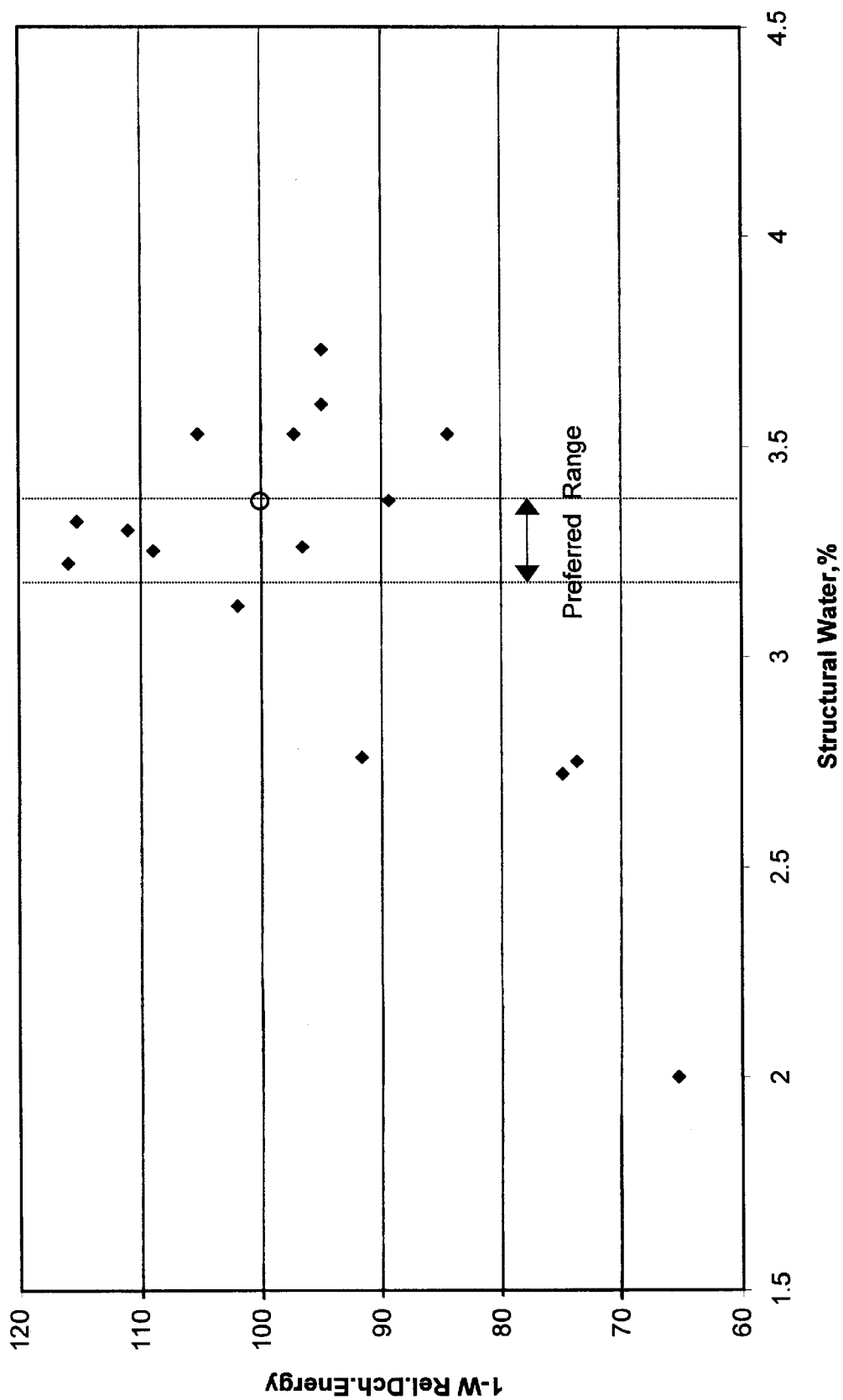
FIG. 8 is a scatter plot of the experimental relative discharge energies in AA cells vs. the structural water content of the EMD samples.
Figure 9:
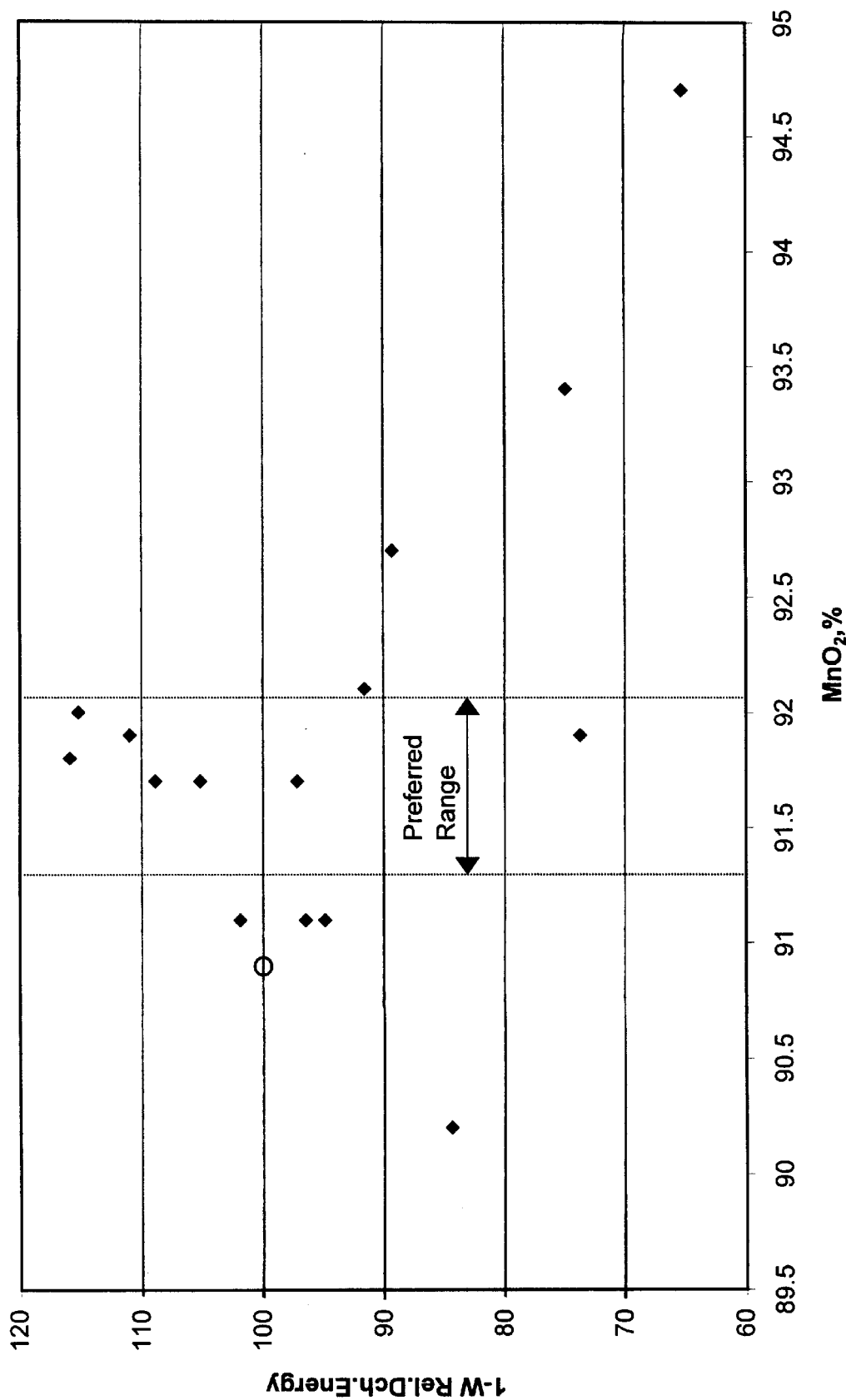
FIG. 9 is a scatter plot of the experimental relative discharge energies in AA cells vs. the $MnO_2$ content of the EMD samples.

FIGS. 8 and 9 show experimental AA-cell discharge energies as a function of the chemical composition for 17 of the 61 test EMD's, the chemical composition being defined by the percentage of structural water (FIG. 8) and MnO$_2$ (FIG. 9). The range of excellence is approximately 3.17–3.38% structural H$_2$O and 91.5–92.1% MnO$_2$. Samples that are outside these ranges of excellence because of low structural water content or high MnO$_2$ content were deposited either at very low current density or in a slurry cell. Samples with structural water contents greater than the range of excellence or MnO$_2$ contents less than the range of excellence generally were deposited by prior art methods at high current densities ($\geqq$5.8 A/ft$^2$), low temperatures (<95° C.), or at non-preferred acid and manganese concentrations.

EXAMPLE 8

Table IV below shows the average relative flooded half-cell discharge capacities for 19 of the EMD's described in Table II. Each capacity is the mean of three or more individual cell capacities. As with the AA-cell energies, the half-cell capacities of Table IV are compared to the mean capacity for Sample 41, which was discharged more than 30 times from several different cathode mixes. The absolute capacity for Sample 41 was 227 mAh/g. Also given in Table IV are the EMD surface areas and the relative rankings of the deposition conditions based on Example 1.

One observes excellent correspondence between the relative capacities and the rankings of the deposition conditions. That is to say, the most preferred deposition conditions (2.5–3.5 A/ft$^2$, 25–40 g/l H$_2$SO$_4$ and 5–20 g/l Mn$^{2+}$) clearly yielded the highest capacities, which were 101–105%; the so-called "good" conditions (3.6–6 A/ft$^2$, 41–50 g/l H$_2$SO$_4$ and 21–50 g/l Mn$^2$,) yielded the next best capacities of 96.0–100.0%; and the poorest conditions, i.e., those outside of both the excellent and good ranges, yielded the poorest capacities, which were between 86 and 94%. The half-cell capacities thus parallel the AA-cell energies with regard to relative performance vs. deposition conditions and EMD properties. These results also complement the AA-cell results, since the half-cell results do not involve anode potentials, and represent constant weight of EMD in each case.

TABLE IV

Half-Cell Results

| EMD Sample | BET Surface Area (m2/g) | Half-Cell Discharge Capacity to 0.9V (% base) | Range of Deposition Conditions (per Example 1) |
|---|---|---|---|
| 1 | 8.2 | 86.8 | less than good |
| 4 | 16.7 | 88.5 | less than good |
| 8 | 19.6 | 93.8 | less than good |
| 9 | 20.5 | 99.6 | good |
| 10 | 20.8 | 91.5 | less than good |
| 13 | 22.1 | 104.4 | excellent |
| 15 | 22.4 | 103.9 | excellent |
| 16 | 22.4 | 105* | excellent |
| 23 | 24.9 | 101.4 | excellent |
| 25 | 26.0 | 98.2 | good |
| 28 | 27.8 | 97.4 | good |
| 30 | 29.0 | 96.9 | good |
| 33 | 30.0 | 86.4 | less than good |
| 34 | 30.1 | 98.2 | good |
| 36 | 30.9 | 96.9 | good |
| 39 | 32.1 | 96.0 | good |
| 41 | 33.6 | 100.0 | good |
| 54 | 43.7 | 99.6 | good |
| 58 | 46.9 | 85.9 | less than good |

*5 sets of tests with different cathode mixes

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved cathode material comprising EMD, said EMD having an AA-cell discharge capacity at a 1 watt discharge rate of about 68.2 milliampere hours per gram or higher and an AA-cell discharge energy at a 1 watt discharge rate of about 755 milliwatt hours or higher.

2. An improved cathode material comprising EMD, said EMD having an intrinsic discharge capacity of about 254.6 milliampere hours per gram or higher and an initial open circuit voltage of about 1.639 volts or higher.

3. An improved cathode material comprising EMD, said EMD having an initial open circuit voltage of about 1.639 volts or higher, an intrinsic discharge capacity of about 254.6 milliampere hours per gram or higher and a compressed density of about 3.162 grams per cubic centimeter or higher.

* * * * *

UNITED STATES PATENT AND TRADEMARK OFFICE
CERTIFICATE OF CORRECTION

PATENT NO. : 6,638,401 B1
DATED : October 28, 2003
INVENTOR(S) : Terrell Neils Andersen et al.

It is certified that error appears in the above-identified patent and that said Letters Patent is hereby corrected as shown below:

Column 18,
Line 28, delete "220 and 370" and insert -- 22° and 37° -- therefor.
Line 30, delete "220/370" and insert -- 22°/37° -- therefor.

Signed and Sealed this

Eighteenth Day of October, 2005

JON W. DUDAS
*Director of the United States Patent and Trademark Office*

US006638401C1

(12) EX PARTE REEXAMINATION CERTIFICATE (8637th)
United States Patent
Andersen et al.

(10) Number: US 6,638,401 C1
(45) Certificate Issued: Oct. 25, 2011

(54) HIGH DISCHARGE CAPACITY ELECTROLYTIC MANGANESE DIOXIDE AND METHODS OF PRODUCING THE SAME

(75) Inventors: Terrell Neils Andersen, Edmond, OK (US); Samuel Faust Burkhardt, Edmond, OK (US); Wilmont Frederick Howard, Jr., Edmond, OK (US); Richard F. Wohletz, Las Vegas, NV (US); Vahid Kazerooni, Yukon, OK (US); Mohammad Reza Moumenzadeh, Oklahoma City, OK (US); Amy Wren Unsell, Choctaw, OK (US)

(73) Assignee: Kerr-McGee Chemical LLC, Oklahoma City, OK (US)

Reexamination Request:
No. 90/006,955, Mar. 1, 2004

Reexamination Certificate for:
Patent No.: 6,638,401
Issued: Oct. 28, 2003
Appl. No.: 09/610,821
Filed: Jul. 6, 2000

Certificate of Correction issued Oct. 18, 2005.

Related U.S. Application Data

(62) Division of application No. 09/217,168, filed on Dec. 21, 1998, now Pat. No. 6,214,198.

(51) Int. Cl.
*H01M 4/06* (2006.01)
*H01M 4/50* (2006.01)
*C25B 1/00* (2006.01)
*C25B 1/21* (2006.01)
*C01G 45/02* (2006.01)
*C01G 45/00* (2006.01)

(52) U.S. Cl. .................. 204/293; 205/533; 423/605; 429/224

(58) Field of Classification Search .................. None
See application file for complete search history.

(56) References Cited

U.S. PATENT DOCUMENTS

| 3,855,088 A | 12/1974 | Kosaka |
| 3,900,385 A | 8/1975 | Era et al. |
| 3,951,765 A | 4/1976 | Everett |
| 4,069,116 A | 1/1978 | Dzhaparidze et al. |

(Continued)

FOREIGN PATENT DOCUMENTS

| AU | 765967 B2 | 10/2003 |
| JP | 9-78275 A | 3/1997 |
| WO | WO-00/30193 | 5/2000 |

OTHER PUBLICATIONS

Meshan Mauthor, "The Effect of Operating Parameters on the Properties of Electrolytic Manganese Dioxide," Ph.D. Thesis, University of Witwatersrand, Johannesburg, South Africa, 1995.*

(Continued)

*Primary Examiner* — Alan Diamond

(57) ABSTRACT

The present invention provides improved cathode material comprised of electrolytic manganese dioxide having high discharge capacity at high discharge rates and methods of producing such electrolytic manganese dioxide by electrolysis in an electrolytic cell. The methods are basically comprised of maintaining a heated high purity aqueous electrolyte solution comprising sulfuric acid and manganese sulfate in the electrolytic cell, the manganese sulfate being present in the solution whereby it contains in the range of from about 5 to about 50 grams of manganese per liter of solution. An electric current is applied to the electrodes of the electrolytic cell whereby the anodic electrode current density is in the range of from about 2.5 to about 6 amperes per square foot.

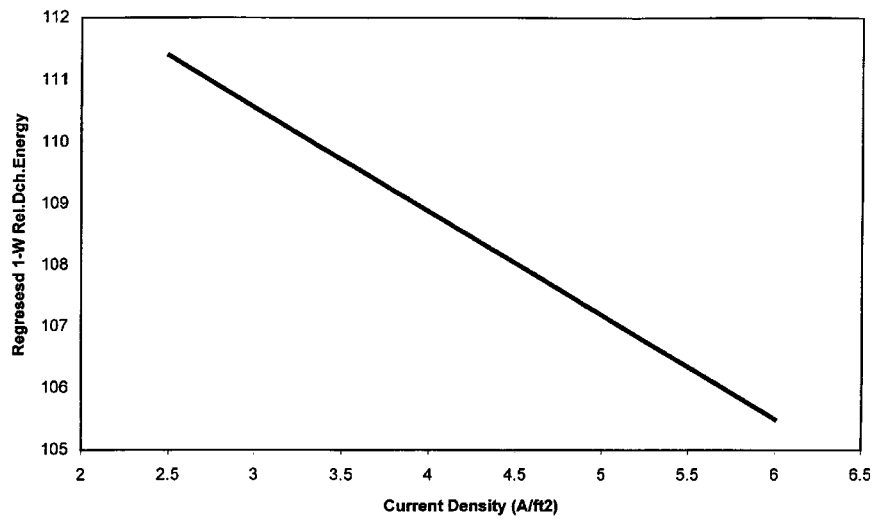

U.S. PATENT DOCUMENTS

| | | | |
|---|---|---|---|
| 4,477,320 A | | 10/1984 | Riggs, Jr. |
| 4,483,828 A | | 11/1984 | Laughlin et al. |
| 4,485,073 A | | 11/1984 | Robertson et al. |
| 4,489,043 A | | 12/1984 | Bowerman et al. |
| 4,606,804 A | | 8/1986 | Schulke et al. |
| 4,744,878 A | | 5/1988 | Riggs, Jr. |
| 5,270,128 A | | 12/1993 | Reichert et al. |
| 5,489,493 A | | 2/1996 | Urry |
| 5,516,604 A | * | 5/1996 | Mieczkowska et al. ...... 429/224 |
| 5,580,681 A | * | 12/1996 | Fleischer ................... 429/304 |
| 5,607,796 A | * | 3/1997 | Jacus et al. ................. 429/165 |
| 5,731,105 A | * | 3/1998 | Fleischer et al. ............ 429/317 |
| 5,746,902 A | * | 5/1998 | Takehara et al. .............. 205/57 |
| 5,866,278 A | * | 2/1999 | Sumida et al. ............... 429/224 |
| 6,143,446 A | * | 11/2000 | Davis et al. ................. 429/224 |
| 6,143,466 A | | 11/2000 | Choi |
| 6,207,322 B1 | * | 3/2001 | Kelsey et al. ............... 429/206 |
| 6,214,198 B1 | | 4/2001 | Andersen et al. |
| 6,225,009 B1 | * | 5/2001 | Fleischer et al. ............ 429/306 |
| 6,527,941 B2 | * | 3/2003 | Andersen et al. ............ 205/533 |
| 6,638,401 B1 | | 10/2003 | Andersen et al. |

OTHER PUBLICATIONS

T. N. Andersen, "Effect of Some EMD Structural Features on Alkaline Discharge Capacity," Progress in Batteries and Battery Materials, 11, 1992, 105–129.*
"New High Rate Panasonic Alkaline Cells," ITE Battery Newsletter, 1, 1996, p. 42.*
Rodney P. Williams, "Characterisation and Production of High Performance Electrolytic Manganese Dioxide for Use in Primary Alkaline Cells," Ph.D. Thesis, University of Newcastle, 1995 pp. i, 99, 101, 106, 258, 267.*
Alleged Sales of EMD in Australia by BHP–Australian Manganese Company Limited or Delta EMD Australia PTY Limited.
Andersen, et al., "Effect of Some EMD Structual Features on Alkaline Discharge Capacity," Progress in Batteries & Battery Materials, 1992, vol. 11, pp. 105–129.
"Battery(electricity)," http://encyclopedia.thefreedictionary.com/Battery%20 (electricity), Aug. 30, 2004, pp. 1–7.
Burkhardt et al., "EMD Alkaline Discharge Testing," Progress in Batteries & Solar Cells, 1988, vol. 7, pp. 311–314.
Burkhardt, "Alkaline Discharge Testing of EMD Samples in Plastic Cells," Progress in Batteries & Battery Materials, IBA Sydney Meeting, 1992, vol. 11, pp. 136–149.
Certificates of Analysis of EMD product produced in Australia by AMCL or Delta EMD Australia Pty Limited.
"Electrolytic Manganese Dioxide From Australia, China, Greece, Ireland, Japan, and South Africa" Investigations Nos. 731–TA–1048–1053 (Preliminary) Publication 3633, Sep. 2003.
Gupta, "Pilot Plant Studies for the Production of Electrolytic Manganese Dioxide and Manganese Metal," Proceedings of the International Symposium on Electrometallurgical Plant Practice, 1990, pp. 141–161.
Hunter, J.C., "Alkaline–Manganese Batteries," Modern Battery Technology, 1991, pp. 111–124, App. A (Ellis Horwood, New York).
ITE Battery Newsletter, No. 1 (Jan.–Feb.) 1996, pp. 1, 23, 42, and cover and table of contents.
Kao et al. "The Influence of Potassium Ion on the Electrodeposition and Electrochemistry of Electrolytic Manganese Dioxide," Journal of Electrochemical Society, 1992, vol. 139, No. 5 pp. 1223–1226.
Kozawa et al., "Progress in Batteries & Solar Cells," IBA Hawaii Meeting, 1988, vol. 7, pp. 2–19.
Kozawa, "Electrochemistry of Manganese Dioxide and Production and Properties of Electrolytic Manganese Dioxide (EMD)," Batteries, 1974, vol. 1(3), pp. 385–485.
Mauthoor, Meshan "The Effect of Operating Parameters on the Properties of Electrolytic Manganese Dioxide" Thesis submitted to Faculty of Engineering, University of the Witwatersrand, Johannesburg, 1995.
Morita et al. "Layered–Structure $BC_2N$ as a Negative Electrode Matrix for Rechargeable Lithium Batteries" J. Electrochem. Soc., vol. 139, No. 5, pp. 1227, 1992.
Preisler, "Electrochemical Procedure in Electrical Generation, Electrical Storage and Electrical Distribution," DECHEMA Monogr., 1987, vol. 109, pp. 123–137.
Preisler, E. "Growth of electrodeposited γ–manganese dioxide from a suspension bath" Journal of Applied Electrochemistry, vol. 19, pp. 540–546 (1989).
Preisler, "How the Solid State Properties of Electrodeposited Manganese Dioxide Correlate with the Conditions of its Deposition," The 2nd Battery Material Symposium (The 3rd MnO2 Symposium), Graz, 1985, vol. 2, pp. 247–266.
Preisler, "Material Problems Encountered in Anodic MnO2 Deposition," Journal of Applied Electrochemistry, 1989, vol. 19, pp. 559–565.
Statement of Grounds and Particulars in Opposition to Australian Patent No. 765,967 (Apr. 8, 2004).
Thackeray, M.M. "Development in Li–Mn–O Electrode Technology For Rechargeable Lithium Batteries".
U.S. Patent Office Order Granting/Denying Request For Inter Partes Reexamination of U.S. Patent No. 6,527,941, May 5, 2004.
Williams, et al., "Effect of Deposition Conditions on the Structural, Chemical, Physical and Electrochemical Properties of EMD," Progress in Battery & Battery Materials, IBA Brussels Meeting, 1994, vol. 13, pp. 102–112.
Williams, R. P., "Statutory Declaration," filed in Opposition to Australian Pat. No. 765,967, filed Jul. 1, 2005, pp. 1–39.
Williams, R.P., "Characterisation and Production of High Performance Electrolytic Manganese Dioxide for Use in Primary Alkaline Cells," Thesis, University of Newcastle, 1995, pp. 1, 99, 101, 103, 106, 258 and 267.
Wohletz et al., "Electrolytic Manganese Dioxide Quality Management, A Case Study," Proceedings of the Symposium on Quality Management in Industrial Electrochemistry, 1992, vol. 93, pp. 49–59.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-3 are cancelled.

* * * * *